(12) United States Patent
Manafighazani et al.

(10) Patent No.: US 11,514,599 B2
(45) Date of Patent: Nov. 29, 2022

(54) SYSTEMS AND METHODS FOR TRACKING MANUFACTURED ARTICLES DURING TRANSFER OPERATIONS

(71) Applicant: James R. Glidewell Dental Ceramics, Inc., Newport Beach, CA (US)

(72) Inventors: Babak Manafighazani, Rancho Santa Margarita, CA (US); Bojun Lin, Costa Mesa, CA (US)

(73) Assignee: James R. Glidewell Dental Ceramics, Inc., Newport Beach, CA (US)

( * ) Notice: Subject to any disclaimer, the term of this patent is extended or adjusted under 35 U.S.C. 154(b) by 28 days.

(21) Appl. No.: 15/800,391

(22) Filed: Nov. 1, 2017

(65) Prior Publication Data

US 2019/0130596 A1 May 2, 2019

(51) Int. Cl.
*G06T 7/70* (2017.01)
*G06Q 10/08* (2012.01)

(52) U.S. Cl.
CPC ............. *G06T 7/70* (2017.01); *G06Q 10/087* (2013.01); *G06T 2207/30164* (2013.01)

(58) Field of Classification Search
CPC ............ G06Q 10/087; G06T 7/70; G06T 2207/30164
USPC .......................................................... 348/94
See application file for complete search history.

(56) References Cited

U.S. PATENT DOCUMENTS

| | | | |
|---|---|---|---|
| 9,174,800 B1 * | 11/2015 | Curlander | B65G 1/02 |
| 2007/0172396 A1 * | 7/2007 | Neeper | G01N 35/00732 422/400 |
| 2013/0343640 A1 * | 12/2013 | Buehler | G06F 17/00 382/155 |
| 2016/0147976 A1 * | 5/2016 | Jain | A61J 1/035 705/2 |
| 2019/0102965 A1 * | 4/2019 | Greyshock | G07F 11/42 |

* cited by examiner

*Primary Examiner* — Kathleen V Nguyen
(74) *Attorney, Agent, or Firm* — Charles Fowler

(57) ABSTRACT

Disclosed are methods and systems for transferring, inspecting, and tracking dental prosthesis during the manufacturing process. The method for transferring, inspecting, and tracking dental prosthesis includes: detecting a first article being transferred from a first container to a second container using one or more images captured by a camera; determining where the first article is transferred to the second container by tracking where the first article is dropped in the second container using the one or more images; and transmitting the location of the first article in the second container to remote server.

20 Claims, 16 Drawing Sheets

SYSTEMS AND METHODS FOR TRACKING MANUFACTURED ARTICLES DURING TRANSFER OPERATIONS

TECHNICAL FIELD

The disclosure relates generally to the field of vision system, and specifically to vision systems that enable the transferring, inspecting, and tracking of manufactured articles, such as dental prostheses, during a manufacturing process.

BACKGROUND

Recently, CAD/CAM dentistry (Computer-Aided Design and Computer-Aided Manufacturing in dentistry) has provided a broad range of dental restorations, including crowns, veneers, inlays and onlays, fixed bridges, dental implant restorations, and orthodontic appliances. In a typical CAD/CAM based dental procedure, a treating dentist can prepare the tooth being restored with a crown, inlay, onlay, veneer, or other restoration. The prepared tooth and its surroundings are then scanned by a three dimensional (3D) imaging camera and the scan data is uploaded to a computer for design. Alternatively, a dentist can obtain an impression of the tooth to be restored and the impression may be scanned directly, or formed into a model to be scanned, and the scan data is uploaded to a computer for design.

Dental prostheses are typically manufactured at specialized dental laboratories that employ computer-aided design (CAD) and computer-aided manufacturing (CAM) milling systems to produce dental prostheses according to patient-specific specifications provided by dentists. In a typical work flow, information about the oral situation of a patient is received from a dentist, and the dentist or dental laboratory designs the dental prosthesis. Where the prosthesis is milled from a block of material, a material block having a size, shape, color, and material-type properties suitable for creating the prosthesis is selected.

After the milling process, the milled restorations are cleaned. Subsequent to the cleaning process, the milled restorations are manually transferred, inspected, and logged (tracked) from the milling and cleaning processes to a sintering tray in preparation for a sintering process. In a manual tracking process, an operator tracks the transfer of each dental prosthesis by a series of steps: 1) pick up a dental prosthesis from a pocket of a container; 2) read and write down the container ID to a spreadsheet; 3) read and write down the dental prosthesis ID to the spreadsheet; 4) read and write down the ID of the pocket of the container from which the dental prosthesis was taken; 5) transfer the dental prosthesis to a destination slot of a sintering tray; 6) read and write down the tray ID to the spreadsheet; 7) read and write down the ID of the destination slot to the spreadsheet; 8) associate the dental prosthesis and the pocket ID with the destination slot ID of the sintering tray; and 9) repeat steps 1-8 for each dental prosthesis that needs to be transferred to the sintering stage.

The manual process as described above is intensive and requires a lot of attention by the operator. A lot of errors can be made at any of the steps 1 through 7. For example, each time an ID is read and recorded, the operator can read and/or enter the ID incorrectly. The operator could also forget to enter the container ID and/or the dental prosthesis ID entirely. In addition, there is information the operator can use to perform quality control such as making sure each dental prosthesis is present in the container/carrier and no unwanted prosthesis is present in the container. Because there is no real-time information about the container, performing quality control can be very difficult for the operator. For example, without real-time data from the dental management system, it would be very difficult for the operator to determine whether each pocket of the container contains the correct dental prosthesis. For example, during the manufacturing process, debris or an errant dental prosthesis can accidentally fall into one of the pockets. But in the manual transferring, inspection, and tracking process, there is no information being exchanged between the operator and the dental prosthesis management system. As such, the opportunity to perform quality assurance during this stage is lost and there is no means for the operator to identify the errant dental prosthesis in the container.

SUMMARY

Disclosed herein are methods and systems for transferring, inspecting, and tracking manufactured articles, such as dental prostheses, during a manufacturing process. The method for transferring, inspecting, and tracking a manufactured article includes: detecting a first article being transferred from a first container to a second container using one or more images captured by a camera; determining a location where the first article is transferred to in the second container by tracking where the first article is dropped in the second container using the one or more images; and transmitting the location of the first article in the second container to a remote server.

Detecting the first article being transferred from the first container to the second container can be accomplished by monitoring for any movement of the first article in the pocket of the first container, which has a plurality of pockets. The method further includes: scanning the first container for a first container ID; transmitting the first container ID to the remote server; and receiving identification data of one or more articles of manufacture in response to transmitting the first container ID. The identification data can include a location data and the ID of each article in the first container. The method also includes verifying each article is in a proper pocket based on the received location data using the one or more images from the camera.

Detecting the first article being transferred from the first container to the second container can further be accomplished by detecting that the first article is absent from a previously verified pocket of the plurality of pockets of the first container. A previously verified pocket is a pocket within which the first article was verified to have been contained.

The method for transferring, inspecting, and tracking manufactured articles further includes overlaying one or more elements of the received identification data of the first article over a destination slot of the second container containing the first article. In some embodiments, identification data of an identification mark on the first container can be obtained using a scanner. The identification mark can be a barcode, a combination of alphanumeric characters, or another form of identification mark.

The method for transferring, inspecting, and tracking manufactured articles further includes scanning the second container for a second container ID. The second container can have a plurality of candidate slots for receiving the manufactured articles, each candidate slot can have its own slot ID. Tracking where the first article is dropped in the second container involves identifying a destination slot where the first article is located from the plurality of candidate slots. Once the identification of the destination slot is identified, the second container ID and the slot ID of the destination slot can be transmitted to a central or remote server.

In some embodiments, one or more pockets of the first container containing an article can be highlighted in response to receiving the identification data for each article in the first container. Additionally, an object not identified by the received identification data on the one or more articles of manufacture can also be highlighted to bring attention to the unidentified object.

The method for transferring, inspecting, and tracking manufactured articles further includes overlaying one or more elements of the received identification data of each article over a corresponding pocket of the first container containing an article identified by the received identification data, in response to receiving the identification data of each article in the first container.

Also disclosed is a system for transferring and tracking manufactured articles, such as dental prostheses. The system comprises: a first tray having a plurality of pockets for holding manufactured articles; a second tray having a plurality candidate slots for receiving manufactured articles; a camera for capturing images of the first and second trays; and a tracking module. The tracking module is configured to: detect a first article being transferred from the first tray to the second tray using the captured images; determine where the first article is transferred to the second tray by tracking where the first article is dropped in the second tray using the captured images; and transmit the location of the first article in the second tray to a remote server.

The tracking module can detect the first article being transferred from the first tray to the second tray by monitoring movement of the first article in a pocket in the first tray, which contains a plurality of pockets. In some embodiments, the tracking module can scan the first tray for a first tray ID, which is then transmitted to the remote server by the tracking module.

The tracking module can receive identification data for one or more manufactured articles in response to transmitting the first tray ID to the remote server. The identification data can include location data and an article ID of each article in the first tray. Tracking module can use the location data and the article ID to verify that each article is in a proper pocket based on the received location data using the one or more images from the camera.

In some embodiments, the tracking module can detect the first article being transferred from the first tray to the second tray by determining that an article is absent from its registered/assigned pocket (in the first tray). A registered/assigned pocket is a pocket that has been previously verified to have contained the article. The tracking module can also overlay, over a destination slot, one or more elements of the received identification data of the first article. A destination slot is a slot to where the first article is transferred.

In some embodiments, the tracking module can also overlay one or more elements of the received identification data of each article over a corresponding or registered pocket of the first tray associated with the received identification data. Additionally, the tracking module can scan the second tray for a second tray ID, with the second tray including a plurality of candidate slots for receiving the manufactured articles. It should be noted that each candidate slot has a slot ID that is scanned and sent to a management system.

The tracking module can receive a destination slot as a candidate slot for receiving a new manufactured article. A candidate slot is an empty slot that is ready to receive a manufactured article.

The tracking module is further configured to highlight each pocket of the first tray containing an article in response to receiving the identification data of each article in the first tray.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF THE DRAWINGS

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

DETAILED DESCRIPTION

Systems and methods for transferring, inspecting, and tracking manufactured articles, such as dental prostheses, during a manufacturing process are provided below. In the following description, for purposes of explanation, numerous specific details are set forth to provide a thorough understanding of the described systems and methods. However, it will be apparent to one skilled in the art that the described systems and methods can be practiced without these specific details. In other instances, structures and devices are shown in a block diagram form in order to avoid obscuring the described systems and methods.

Overview

Figure 1:
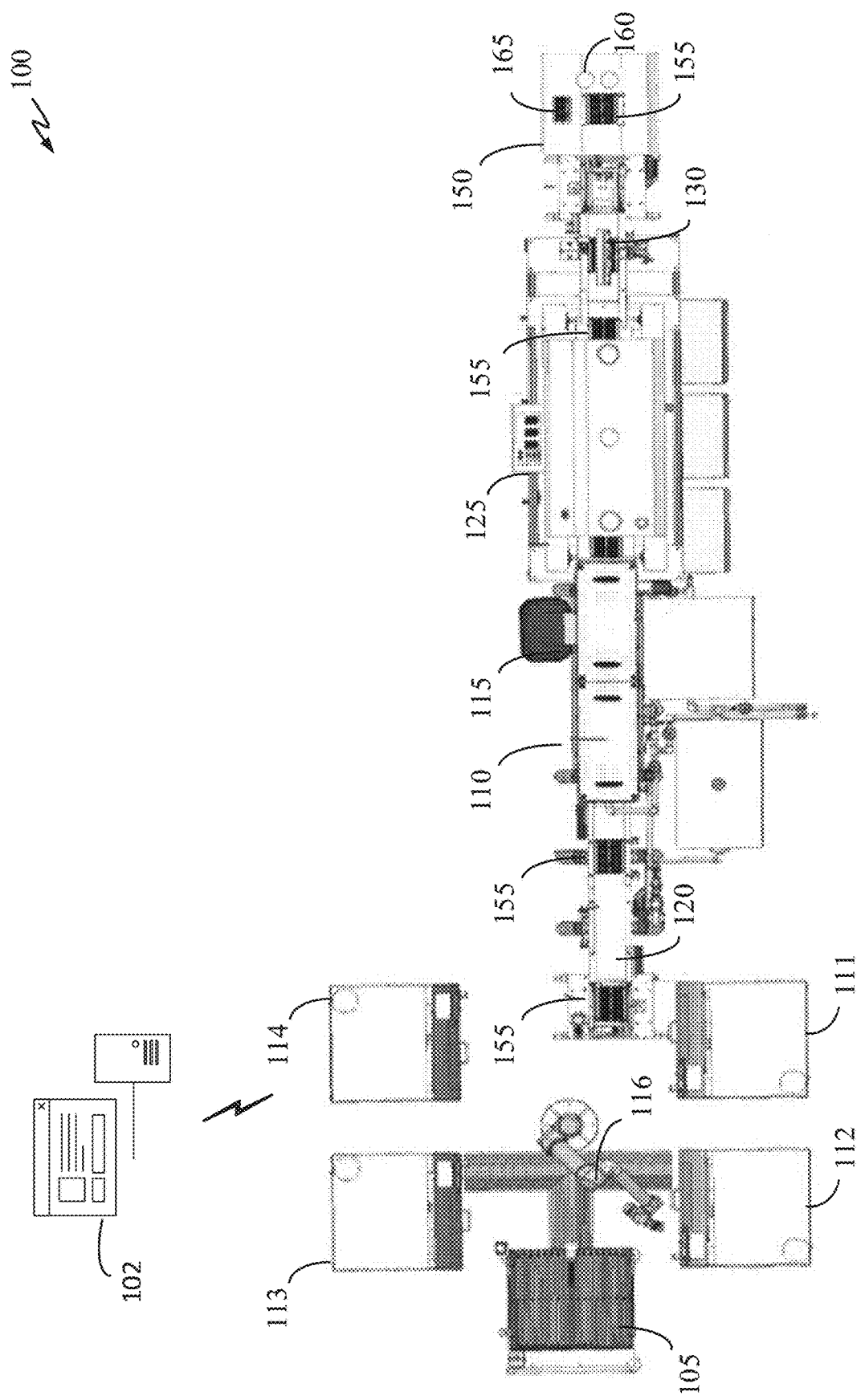
FIG. 1 is a high-level block diagram of a system for manufacturing dental prostheses in accordance with some embodiments.

Systems and methods for manufacturing of dental prostheses are described below. FIGS. 1A and 1B illustrate a system 100 for manufacturing custom designed dental prostheses in a continuous automated process in accordance with some embodiments of the disclosure. Information concerning custom dental prostheses (or articles of manufacture) can be received by a dental prosthesis management system 102 that is in communication with an automated manufacturing system 100. The dental prosthesis management system 102 can be locally or remotely located. Additionally, one or more functionalities (modules) of the dental prosthesis management system 102 can reside locally. For example, a local tracking and inspection module can be part of the dental prosthesis management system 102, and a plurality of dentition databases (not shown) can be located on the cloud.

The system 100 includes a plurality of process stations such as a milling center 105, a separating station 110, a scrap disposal station 115, and a transfer and inspection/tracking station 150. The milling center 105 can mill material blocks and form custom dental prostheses according to design specifications, which can be obtained from the dental prosthesis management system 102. The separating station 110 is provided for separating workpieces into milled custom dental prostheses and remnant material blocks. The scrap disposal station 115 can be provided to remove and eliminate remnant material blocks from further processing.

The system 100 may include a transfer system, such as a conveyor system 120 comprising one or more conveyor units that automatically and/or simultaneously transfers a plurality of custom dental prostheses between the remaining post-milling process stations. Each process station may comprise a different transfer unit, or a different conveyor suitable to the environmental conditions of the process. Optionally, additional process stations may be included in the automated system, including an oven 125 for thermal treatment, and a cooling unit 130.

A carrier or container 155 may be provided to move material blocks and dental restorations between processing units. In one embodiment, the container 155 may have a structure that is configured to interface with each process station, including individual pockets or compartments to separate and track a plurality of custom milled workpieces for simultaneous processing into custom dental prostheses in a hands-free and automated process. The container 155 can include a plurality of pockets to hold a plurality of workpieces in a specified location and orientation for processing through the plurality of process stations. Each station, such as the separating unit 110 and the scrap disposal unit 115, may comprise devices having components in spaced arrangements that align with the tray pockets and with the orientation of workpieces held within the pockets. The assignment of an individual workpiece to a specific tray pocket isolates each workpiece and identifies the custom dental prostheses throughout the automated process until removal of the prostheses from the tray, for accurate association of each custom dental prosthesis with corresponding dental prosthesis information.

The dental prosthesis management system 102 may receive dental prosthesis information associated with a proposed custom dental prosthesis to be processed by the milling center 105. The dental prosthesis management system 102 may organize automation of prosthesis manufacturing in a first-in-first-out data structure. Requests of a plurality of dental prostheses may be processed and executed in the order in which their associated dental prosthesis information is received by the dental prosthesis management system 102. Alternatively, the prostheses requests may be executed by another prioritization scheme based on, for example, material availability, downstream manufacturing process flow, "expedited" status, or other factors.

The dental prosthesis management system 102 may comprise a system capable of performing tasks related to the manufacture of dental prostheses, and can be implemented on a computer system, such as a server. The dental prosthesis management system 102 may include a module for selecting dental prostheses, a machining instructions tool, one or more cameras, one or more sensors, and a dental prosthesis database. The machining instructions tool, in turn, may include more than one database for storing information related to the modules or materials used within the system and information pertaining to the custom dental prosthesis, and machining instructions. Databases may be internal to the dental prosthesis management system 102, located on an external device connected to the dental prosthesis management system 102, or located remotely, such as in cloud-based storage.

Information used to design and/or manufacture a dental prosthesis for a patient may be received by the dental prosthesis management system 102 from a dentist or dental office. In some representative examples, a dentist or dental office will provide information concerning the oral situation of a patient, such as a physical impression or an electronic file containing a digital scan of the patient's oral situation. Additionally, the dentist or dental office may also provide instructions for the material or materials to be used to manufacture the prosthesis, the type and construction of the prosthesis, the shade or other aesthetic features for the prosthesis, and the like. As used herein, the term "dental prosthesis" refers to any dental restorative including, without limitation, crowns, bridges, dentures, partial dentures, implants, onlays, inlays, or veneers.

In some embodiments, information regarding the selected material block is used for calculating machining instructions, and is stored in a database of the dental prosthesis management system 102. For example, material blocks that undergo dimensional reduction after milling and sintering are associated with material-specific information in order to accurately calculate machining instructions to derive the dimensions of an enlarged prosthesis milled from a pre-sintered block. The information regarding the material properties of the specific material that is used in the milling calculations may be associated with the material, and stored in a data base until the material block is selected and the information is retrieved.

After all machining steps are completed, the workpiece may be removed from the mill manually, or by a robotic handler 116. In one embodiment, the robotic handler 116 loads a plurality of custom workpieces from a single mill or a plurality of mills (e.g., mills 111, 112, 113, and 114) onto the container 155.

Transfer and Tracking System

The system 100 can also include a transfer-tracking station 150, which can include one or more cameras 160, a sintering (transfer tray) 165, one or more scanners (not shown), and the container 155. The container 155 is translated to the transfer-tracking station 150 via the conveyor system 120 until the container 155 is in the field of view of the camera 160. The container 155 can be translated until it is approximately at or near the center of the field of view of the camera 160. The transfer-tracking station 150 includes the sintering tray 165 with a plurality of destination slots, which are made to receive articles of manufacture or dental prostheses. The sintering tray 165 can be made of ceramics or other materials that can withstand high temperature for a long duration. For example, during the sintering process, the sintering tray 165 can be exposed to a temperature range of 500°–2500° C. for several hours. The high temperature sintering process demands the use of different containers between the manufacturing process (e.g., milling, cleaning, etc.) and the sintering process. Accordingly, a transfer of the dental prosthesis between the container 155 and the sintering tray 165 is required unless, as in some embodiments, a single high-temperature ceramic tray is used in both the manufacturing and sintering processes. However, due to the high cost and brittleness of ceramic trays, and the different environmental conditions to which the container 155 and the sintering tray 165 are exposed, the system 100 preferably has a two-container setup.

Once the container 155 reaches the transfer-tracking station 150, it is scanned by a scanner (not shown) or by the camera 160. The system 100 can include a scanner on the bottom or side of the transfer-tracking station 150 that can scan a barcode or other types of marking such as alphanumeric characters, QR code, shapes, or the like, located on the bottom or side of the container 155 and the sintering tray 165. The system 100 can also scan for the ID of the container 155 or the tray 165 using the camera 160, which can detect visual markings such as barcodes, patterns, QR code, alphanumeric characters, or the like, imprinted on a surface of the container 155 and the tray 165.

Once the container ID for the container 155 is obtained, it can be transmitted to the dental prosthesis management system 102. In response to receiving the container ID from the transfer-tracking station 150, the dental prosthesis management system 102 can query for the container ID from one or more databases to obtain cargo information for each article in the container 155. Cargo information can be identification data for each article of manufacture or dental prosthesis. The identification data can include a container ID, a container-pocket ID, a sintering tray ID, a destination slot ID, a dental prosthesis ID, a dental prosthesis type, a material block ID, a patient ID, a doctor ID, etc. A container-pocket ID (or simply pocket ID) is an identifier that identifies a particular pocket in a container (e.g., the container 155). For example, the container 155 can have 16 pockets. In this example, each pocket can be assigned a pocket number 1 through 16. A destination slot ID (or slot ID) is an identifier that identifies a particular destination slot in a sintering tray (e.g., the tray 165), which can have up to 16 slots.

After a material block is milled, it is placed in one of the pockets of the container 155 by the robotic handler 116. At this moment, the pocket, in which the milled material block is placed, is recorded and the pocket's ID is transmitted to the dental prosthesis management system 102. In this way, the system 100 can keep track of each dental prosthesis from its creation all the way through sintering and on to the finishing stage.

One or more portions of the identification data can be updated at each processing stage in the system 100. For example, after the robotic handler 116 places a milled material block into one of the pockets of the container 155, the identification data can be automatically updated to include the pocket ID of a container. Similarly, after a dental prosthesis is transferred from the container 155 to the sintering tray 165, the identification data can be automatically updated to include the slot ID where the dental prosthesis is placed. The automation of the tracking process greatly reduces errors as compared to tracking and recording the location of a dental prosthesis manually.

In a manual tracking process, an operator tracks the transfer of each dental prosthesis in a series of steps: 1) pick up a dental prosthesis from a pocket of a container; 2) record the container ID to a spreadsheet; 3) record the dental prosthesis ID to the spreadsheet; 4) record ID of the pocket of the container from which the dental prosthesis was taken; 5) transfer the dental prosthesis to a destination slot of a sintering tray; 6) record the tray ID to the spreadsheet; 7) record the ID of the destination slot to the spreadsheet; 8) save the spreadsheet; and 9) repeat steps 1-8 for each dental prosthesis in the container 155. As can be deduced from above, the manual process is intensive and requires a lot of operator attention. There are many places where errors can be made. For example, each time an ID is read and recorded, the operator can read and/or enter the ID incorrectly. The operator could also forget to enter the container ID and/or the dental prosthesis ID entirely. In addition, it is very difficult (if not impossible) for the operator to determine whether each pocket of the container 155 contains the correct dental prosthesis. For example, a certain pocket of the container 155 should be empty. However, during the manufacturing process, debris or an errant dental prosthesis can accidentally fall into one of the pockets. But in the manual transferring and tracking process, there is no information being exchanged between the operator and the dental prosthesis management system 102. As such, the opportunity to perform quality assurance during this stage is lost.

In the system 100, the transfer-tracking station 150 can receive real-time (or most recently updated) data for the container 155 from management system 102. The real-time data received can be cargo information for the container. As previously mentioned, cargo information can include identification data of each dental prosthesis, which allows the system/operator to identify the exact location, type, ID, etc., of a dental prosthesis. In some embodiments, using the cargo information received, the transfer-tracking station 150 can highlight on a display (not shown) each pocket of the container 155 that is registered to host a dental prosthesis. For example, the cargo information of the container 155 can indicate that pockets 1-4 contain dental prostheses and pockets 5-8 are empty. In this example, the transfer-tracking station 150 can highlight pockets 1-4 of the container 155 to visually indicate to the operator that pockets 1-4 are not empty. In some embodiments, the transfer-tracking station 150 can also highlight pockets 5-8 using a different color/pattern to visually indicate to the operator that pockets 5-8 are empty.

The transfer-tracking station 150 can also display one or more portions of the cargo information. In some embodiments, the transfer-tracking station 150 can overlay one or more portions of the cargo information over one or more pockets of the container 155. For example, the transfer-tracking station 150 can display over pocket 1 of the container 155 the following information: pocket ID, dental prosthesis type (e.g., crown, inlay, overlay, bridge, etc), and dental prosthesis ID. This allows the operator to quickly determine which pockets are occupied and which are empty. This also helps the operator to spot for errant prosthesis or debris that have inadvertently fallen into one of the pockets not designated to host a dental prosthesis.

The transfer-tracking station 150 may continuously follow a dental prosthesis from the moment it is picked up from the container 155 to the moment when it is placed into a destination slot of the tray 165. In this way, a continuous chain of custody of the dental prosthesis can be ensured from the container 155 to the tray 165.

Figure 2:
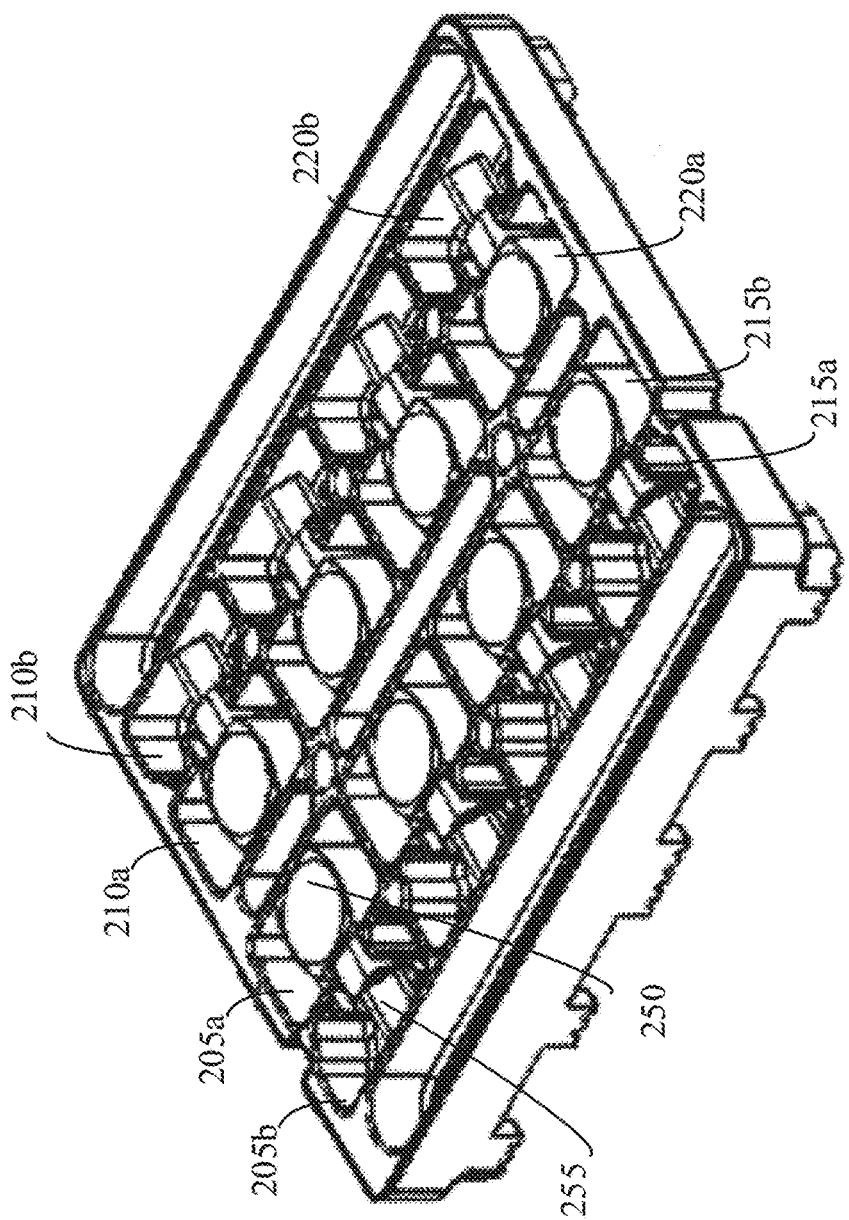
FIG. 2 is a perspective view of a prosthesis carrier/container.

FIG. 2 is a perspective view of the container 155 in accordance with some embodiments of the present disclosure. The container 155 can have a plurality of pockets. In one embodiment, the container 155 can have 16 pockets. Every two pockets can form a containment compartment to hold a material block 250 and a mandrel 255, which is directly coupled to the material block 250. For example, as shown in FIG. 2, pockets 205a and 205b form a containment compartment that holds the material block 250 and the mandrel 255. The container 155 can have two or more containment compartments. In one embodiment, the container 155 can have eight containment compartments including the four compartments indicated by 205a-b, 210a-b, 215a-b, and 220a-b.

Figure 3B:
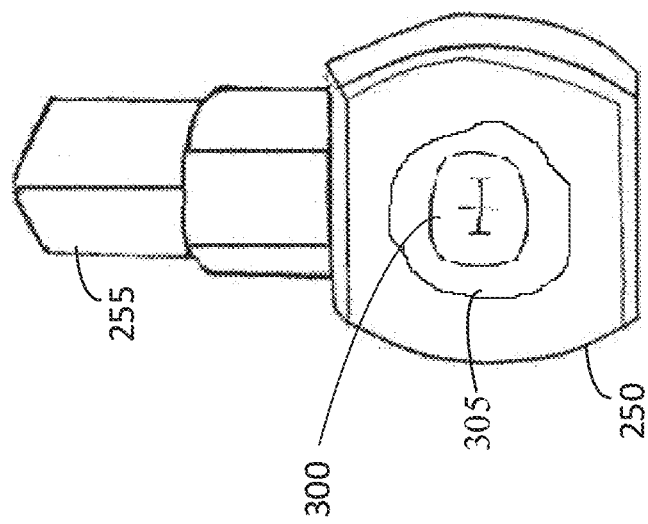
FIG. 3B is a perspective view of a milled material block.
Figure 3A:
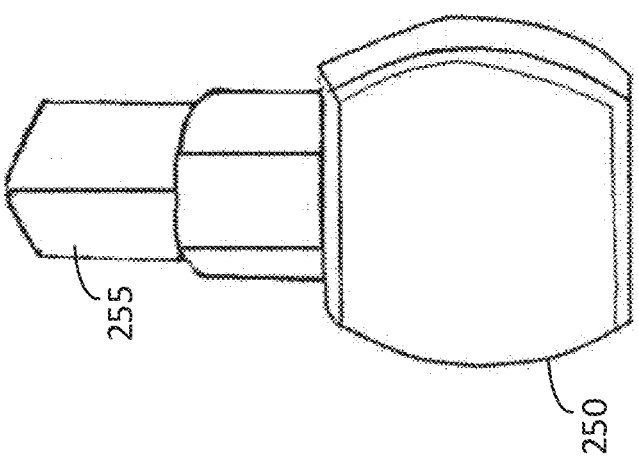
FIG. 3A is a perspective view of a material block.

FIGS. 3A-B illustrate a milling stock that includes the material block 250 and the mandrel 255. The milling block shown in FIG. 3A is pre-milling, and the milling block shown in FIG. 3B is post-milling. During the milling stage, a rough crown pattern is milled into the material block 250. The result is a rough crown 300 in the middle of the material block 250 as shown in FIG. 3B. The rough crown 300 is milled to have the exact dimensions as specified by the dental prosthesis management system 102. The rough crown 300 can be milled to have any particular peripheral shape and surface dentition features as desired. After the material block 250 is milled to have the rough crown 300, the next step is to completely detach it from the material block 250. This can be done by milling completely through a valley portion 305, which is the valley surrounding the rough crown 300. Once the rough crown is removed, it is placed into one of the pockets of the container 155.

Figure 4:
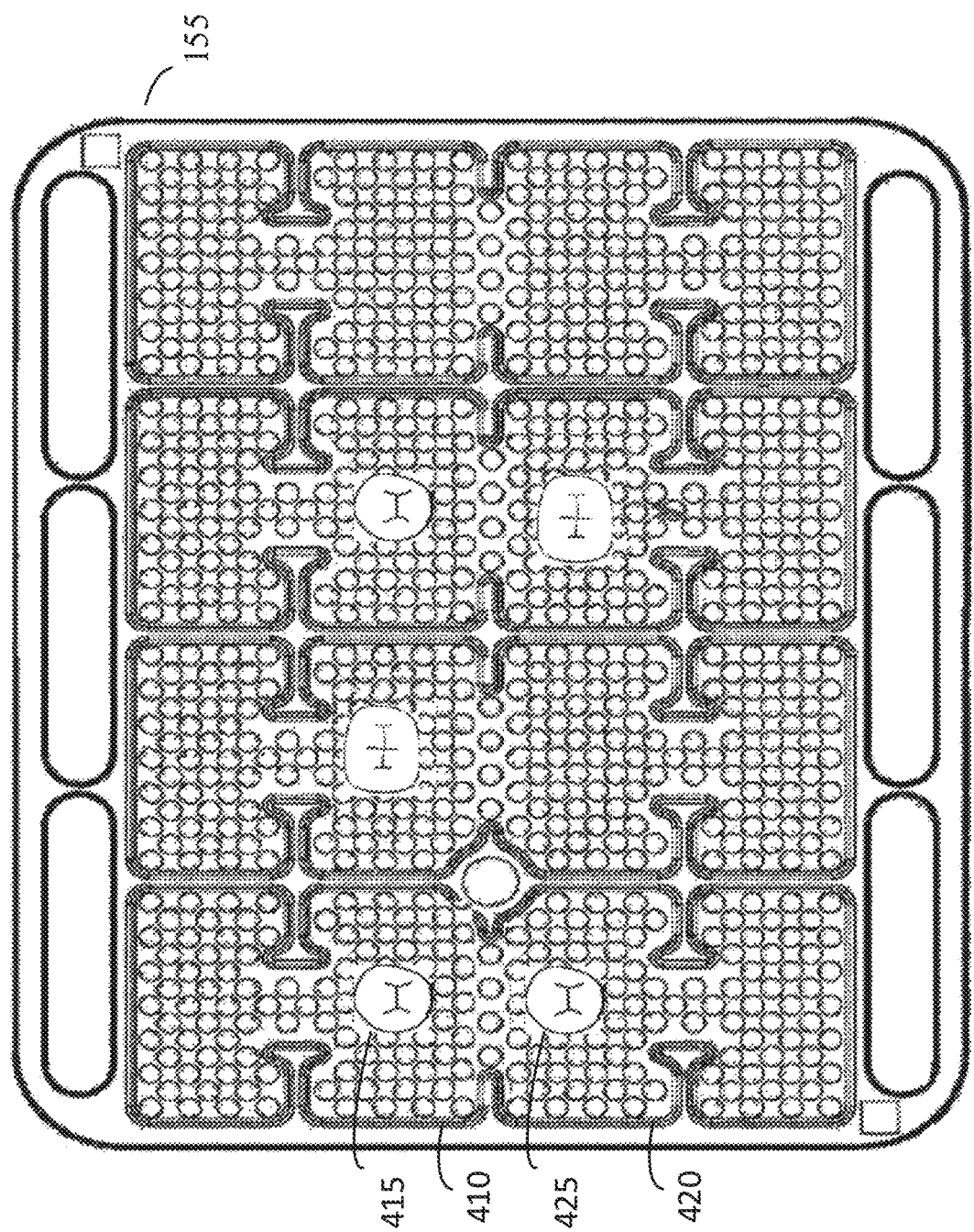
FIG. 4 is a top view illustrating a prosthesis carrier/container having a plurality of dental prostheses.

FIG. 4 is a top view of the container 155 having a plurality of milled dental prostheses after they are removed from their material blocks, which have been discarded in a previous cleaning process. The cleaned dental prostheses can be in any of the plurality of pockets of the container 155. In some embodiments, each of the milled dental prostheses is placed in the same pocket that holds the material block from which the dental prosthesis was milled. In this way, each dental prostheses can be tracked and traced back to their original material blocks. For example, a material block that was in a pocket 410 can be milled into a crown 415, which is also placed in the same the pocket 410 after the milling and cleaning processes. Similarly, a material block that was in a pocket 420 is milled into a crown 425, which is also placed into the same pocket 420 so that the crown 425 can be properly tracked throughout the manufacturing process. In some embodiments, the crown 425 can be placed into a different pocket of the container 155 and the ID of the new pocket is transmitted along with the crown ID to the management system 102.

Figure 5:
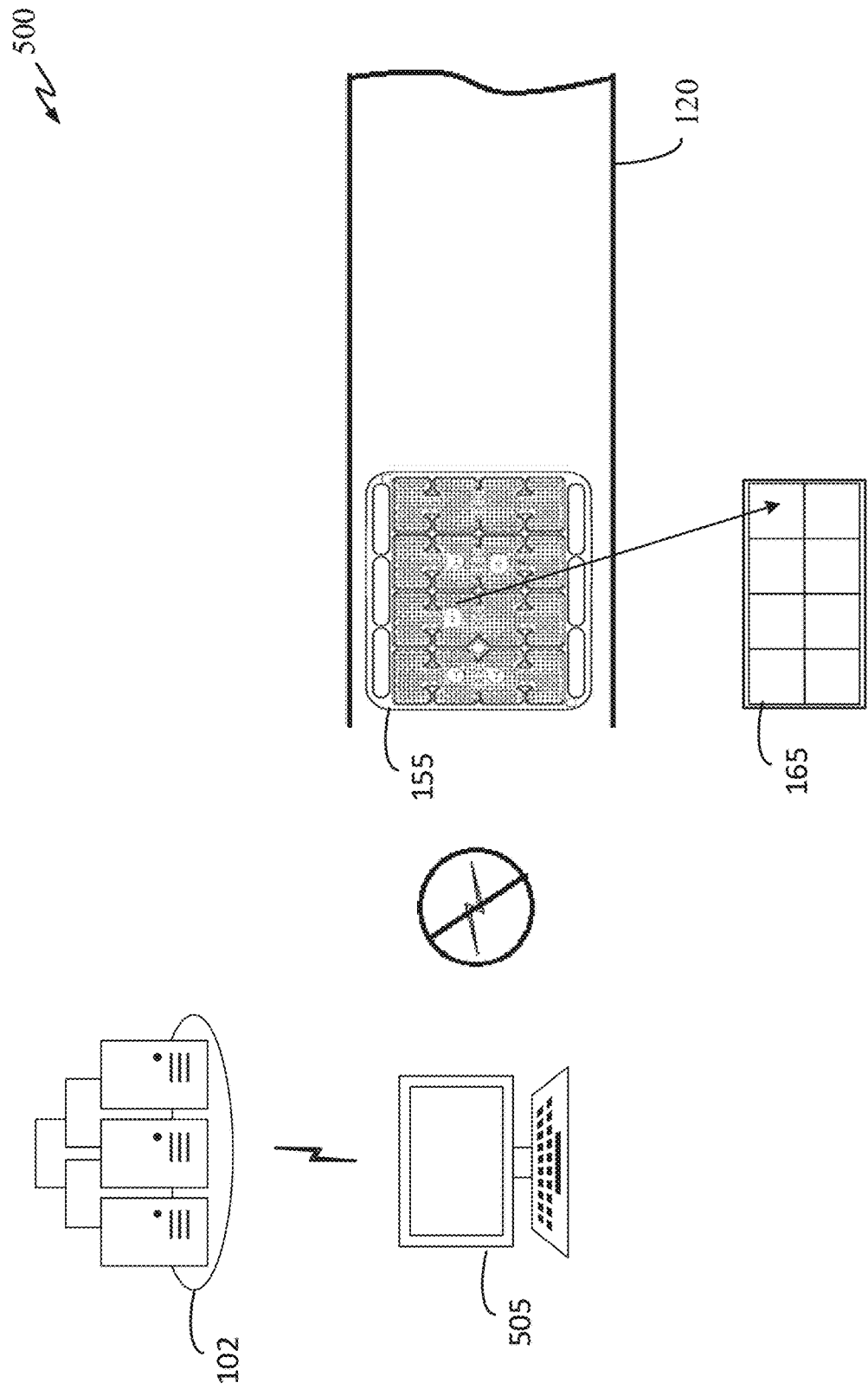
FIG. 5 is a high-level system diagram of a conventional transferring and tracking process.

FIG. 5 illustrates a conventional tracking and transfer process 500, which does not include a scanning and tracking systems to automatically log the IDs of the container 155, the tray 165, and the plurality of dental prostheses in the container 155. Here, the transfer and tracking process is performed manually. The system 500 includes a computer 505 that can be used by the operator to manually log the IDs of the container 155 and the tray 165. The operator can also log the IDs of each dental prosthesis transferred to the tray 165 and the ID of the destination slot of the tray 165 in which each dental prosthesis is placed. The operator can manually log the above mentioned transfer related data into a spreadsheet on the computer 505. Alternatively, the operator can manually log the transfer related data on a log book. In the conventional system 500, the computer 505 can be networked to the management system 100 so that all of the entered data can be uploaded to the cloud. However, all of the transfer related data still need to be manually collected and entered into the computer 505 as conventional methods of transferring and tracking dental prostheses lack a scanning and vision tracking system.

In the conventional process, a crown is picked up from one of the pockets of the container 155 and transferred to one of the destination slots of the tray 165. The container ID, pocket ID, tray ID, and destination slot ID are then manually recorded to log the transfer. Next, the process repeats for the next crown. However, errors can occur in the manual tracking process because any one of the IDs (e.g., container ID, tray ID, pocket ID) can be misread and/or mistakenly recorded as a different ID. Further, to increase speed and efficiency, an operator may elect to transfer multiple crowns before recording the transfers. This method may be efficient but it is prone to errors as the operator may forget and/or inadvertently record any of the IDs incorrectly. For example, the operator may transfer three crowns to three different destination slots of the tray 165. However, because the operator did not record the proper destination slot ID after each transfer, the operator may reverse the order of the destination slot ID when logging the transfer at a later time. Further, the operator may remember correctly, but nevertheless can enter the data into the log book or the computer 505 incorrectly.

Figure 6:
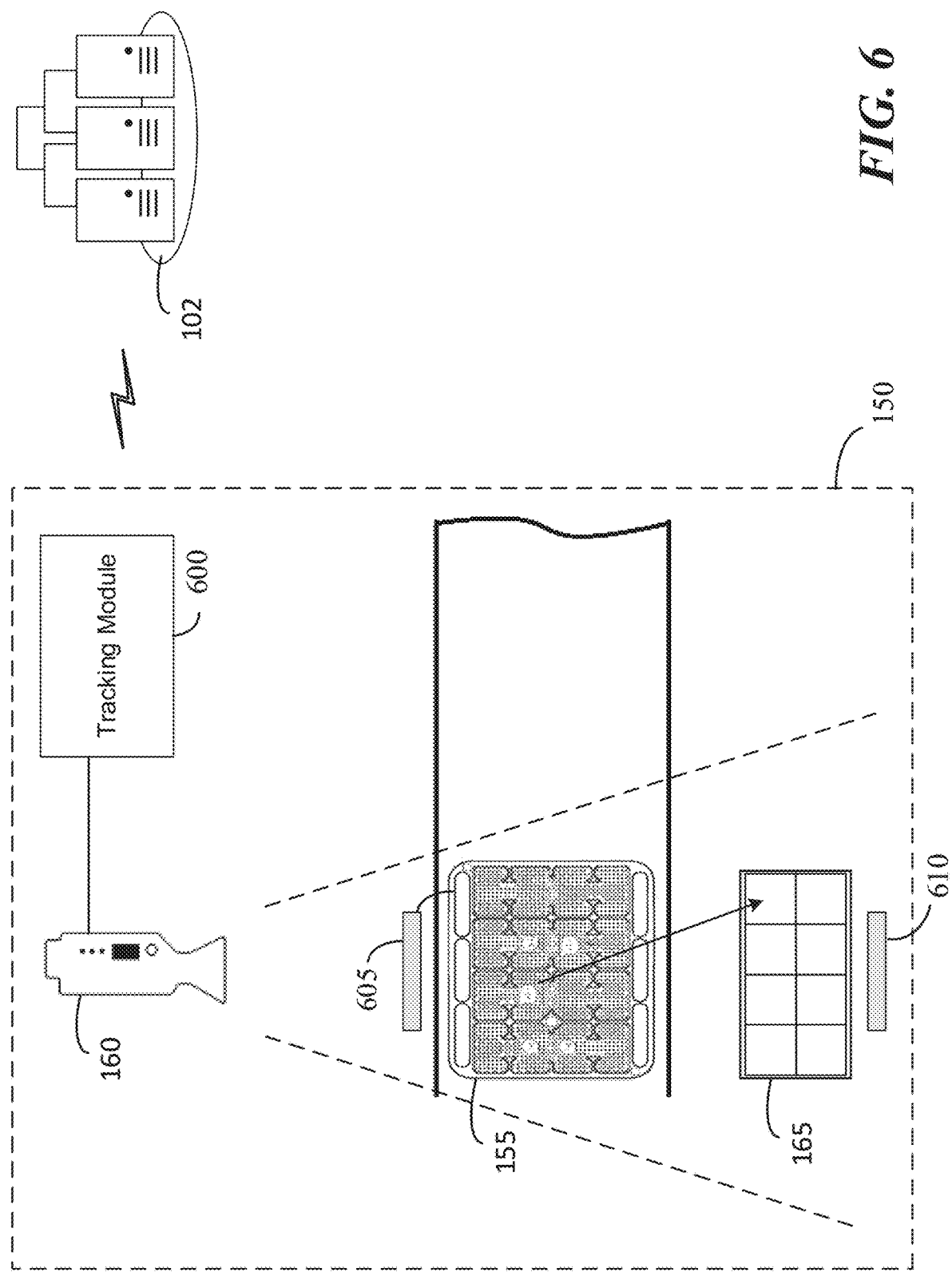
FIG. 6 is a diagram of a transferring and automatic tracking system in accordance with some embodiments.

FIG. 6 illustrates a layout of the transfer-tracking station 150 in accordance with some embodiments of the present disclosure. Similar to conventional manual transfer and tracking processes, the transfer-tracking station 150 includes the conveyor system 120, the container 155 and the tray 165. However, unlike conventional transfer and tracking systems, the transfer-tracking station 150 includes a camera 160, an integrated tracking module 600, a container scanner 605, and a tray scanner 610. The integrated tracking module 600 can be in direct communication with the management system 102 in order to receive real-time (or most recently updated) cargo information for the container 155. In this way, the tracking module 600 can obtain the IDs and exact pocket location of each dental prosthesis in the container 155. The tracking module 600 can optionally display one or more portions of the cargo information to the operator. For example, as previously mentioned, the cargo information may include a container ID, a container-pocket ID, a sintering tray ID, a destination slot ID, a dental prosthesis ID, and a dental prosthesis type. The tracking module 600 can display one or more portions of the cargo information by displaying the container ID, the tray ID, pockets IDs, and destination slots IDs, etc., on a display.

The scanners 605 and 610 can be visual scanners, barcode scanners, or other type of scanners such as RF scanners. The container 155 and the tray 165 can include identification data on one or more surfaces that enable scanners 605 and 610 to scan and obtain the IDs of the container 155 and the tray 165. The identification data can be a barcode, alphanumeric characters, patterns, an embedded radio frequency identification (RFID) chip, a near-field communication chip, etc. In some embodiments, each the container 155 and the tray 165 can have a barcode and scanners 650 and 610 are barcode scanners. For example, the container 155 can have a barcode on one of the sides and the container scanner 605 can be positioned to scan the barcode as the container 155 comes into position. Similarly, the tray 165 can have a barcode on one of the sides or on the bottom. During operation, the operator would place the tray 165 into position and the tray scanner 610 would automatically scan the barcode of the tray 165.

Alternatively, the container 155 and the tray 165 can have visual markings (e.g. patterns, alphanumeric script, etc.) that can be picked up by a camera. In this embodiment, the scanners 605 and 610 are cameras. In some embodiments, the ID scanning function can be integrated into the camera 160, making the scanners 605 and 610 optional.

The camera 160 and the scanners 605 and 610 can be automatically controlled by the tracking module 600. Once the IDs of the container 155 and the tray 165 are scanned, the tracking module 600 can automatically transmit the scanned IDs to the management system 102. In this way, human errors relating to the collection of IDs of the container 155 and the tray 165 can be greatly reduced or entirely eliminated. The management system 102 can use the ID of the container 155, received from the tracking module 600, to query for the cargo information of the container 155. The cargo information can then be transmitted back to the tracking module 600, which can display one or more portions of the cargo information to the operator. The tracking module 600 can also use the cargo information to highlight any pocket that is carrying a dental prosthesis according to the logged cargo information.

Figure 7:
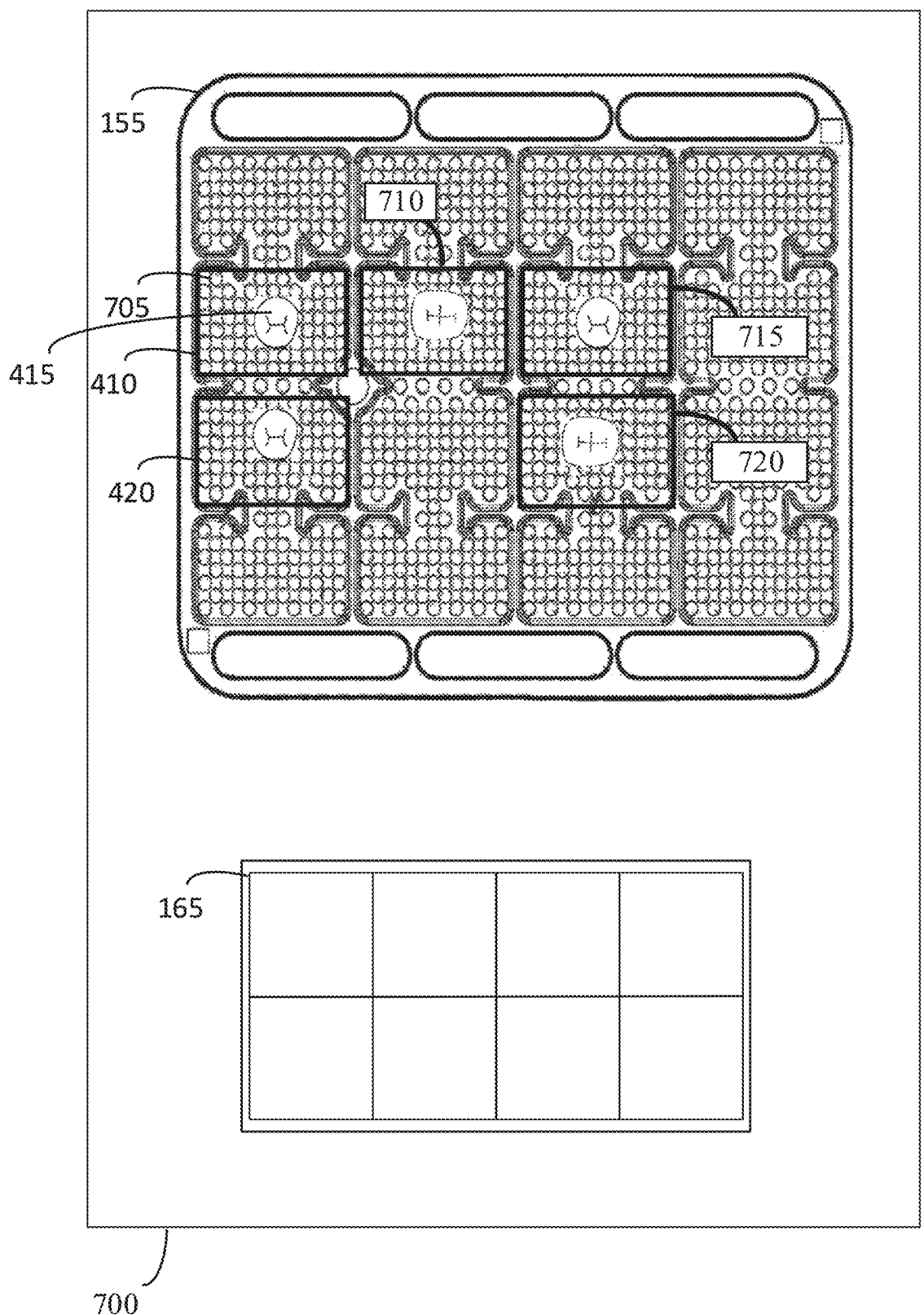
FIG. 7 illustrates a user interface of the transferring and tracking system in accordance with some embodiments.

FIG. 7 illustrates an exemplary user interface 700 in accordance with some embodiments of the present disclosure. The user interface 700 can be generated by the tracking module 600 using images captured from the camera 160. As shown, the user interface 700 can display both the container 155 and the tray 165 on the same display (e.g., computer monitor, LCD screen, etc.). Alternatively, the display of the container 155 and the tray 165 can be split on different displays.

Using the cargo information received from the management system 102, the tracking module 600 can highlight various portions of the container 155 that contain or do not contain dental prostheses. In some embodiments, only pockets with pocket IDs that correspond to IDs of dental prostheses are highlighted. In other words, only pockets that are registered to hold dental prostheses are highlighted. In this way, the operator can make a quick determination which pockets of the container 155 are occupied or empty. For example, the pocket 410 of the container 155 can be highlighted using a rectangle 705 that highlights the perimeter of the pocket 410. Rectangle 705 can be displayed using one or more colors and can flash or exhibit motion. Rectangle 705 can have other shapes such as an oval, etc. The pocket 410 can also be highlighted using overlay or other visual means to distinguish the pocket 410 from other pockets of the container 155 that are empty. In this way, the operator can quickly determine that the pocket 410 contains a dental prosthesis 415. Additionally, if the pocket 410 is highlighted and the dental prosthesis 415 is not present, then the operator can quickly determine that the dental prosthesis is lost or misplaced. This enables the operator to perform quality control on the fly and take the necessary steps to correct the error.

As shown in FIG. 7, every pocket of the container 155 with a dental prosthesis is visually distinguished from pockets that are empty. For example, the pockets 410, 420, 710, 715, and 720 are visually distinguished by outlining each of the pocket's perimeter. In some embodiments, occupied pockets can be visually distinguished by displaying occupied pockets in a different color using overlays, for example.

Figure 8:
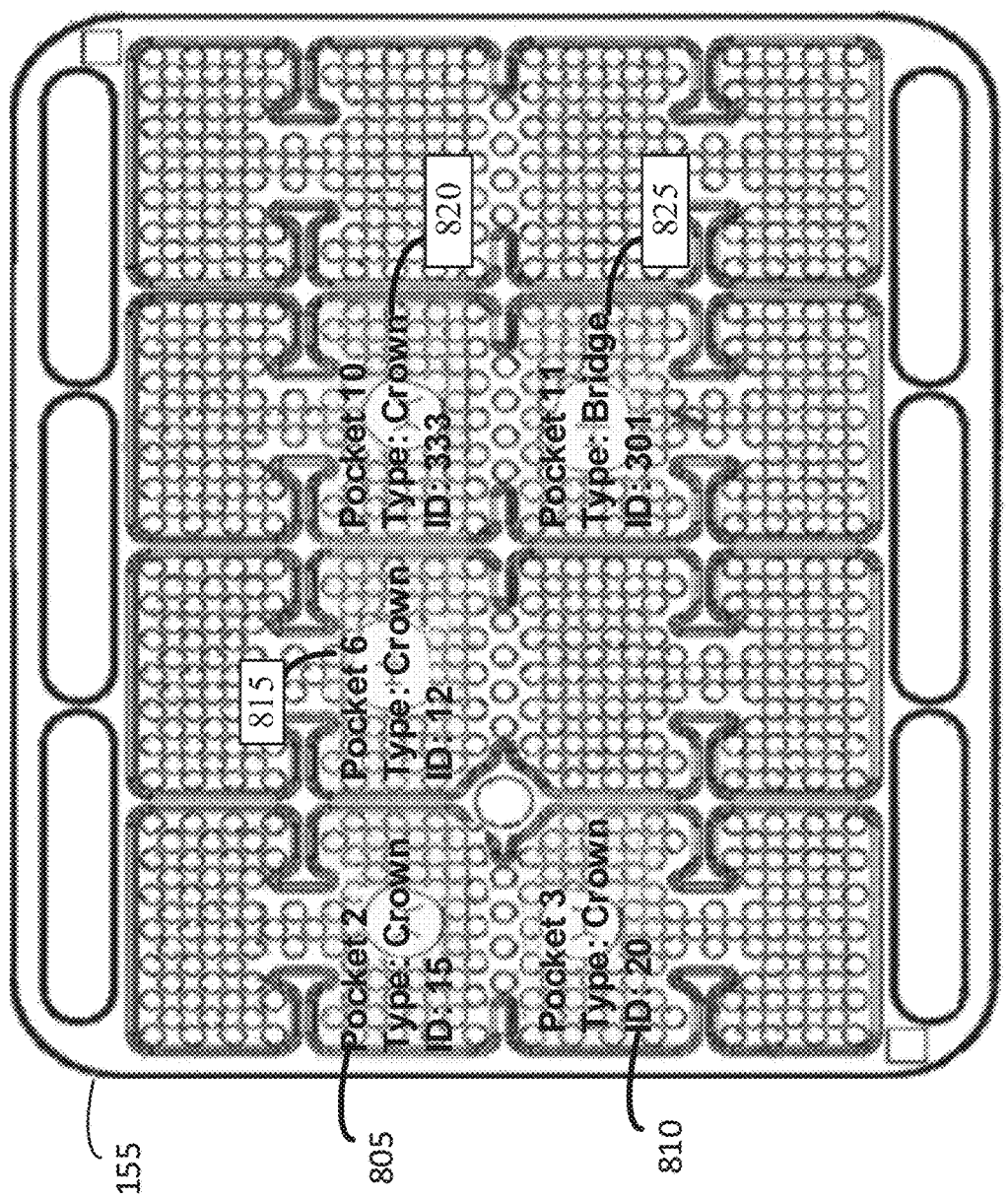
FIG. 8 illustrates various display features in accordance with some embodiments of the present disclosure.

FIG. 8 illustrates a user interface 700 having overlays of cargo information over the container 155 in accordance with some embodiments of the disclosure. The user interface 700 can include one or more overlays that are placed over occupied pockets (i.e., pockets registered to contain dental prostheses) of the container 155. An overlay can include one or more portions of the cargo information received from the management system 102. In some embodiments, an overlay can include the pocket ID, the dental prosthesis type, and the dental prosthesis ID. In some embodiments, the overlay can be toggled on or off by the operator, which can allow the operator to have a better view of the dental prosthesis.

The tracking module 600 can display an overlay on one or more of the occupied pockets. In some embodiments, all occupied pockets can have an overlay. The overlay can be semi-transparent or fully opaque. In some embodiments, the overlay is semi-transparent to enable the operator to view the pocket beneath and to make a quick determination whether the dental prosthesis registered to that pocket is present or absent.

As shown, the user interface 700 include overlays 805, 810, 815, 820, and 825. Each overlay contains cargo information specific to the pocket underneath. For example, the overlay 805 corresponds to a pocket of the container 155 with an ID of 2. The overlay 805 further shows that pocket number 2 is registered to contain a crown with an ID of 15. Similarly, the overlay 810 corresponds to a pocket of the container 155 with an ID of 3. The overlay 810 also shows that pocket number 3 is registered to contain a crown with an ID of 20. Additionally, the overlay 825 shows that the pocket 11 is registered to contain a bridge having an ID of 301. Using this information, the operator can quickly perform quality control by checking the pocket 11 of the container 155 to determine whether a bridge is present and not another type of dental prosthesis such as a crown or an inlay.

Figure 9:
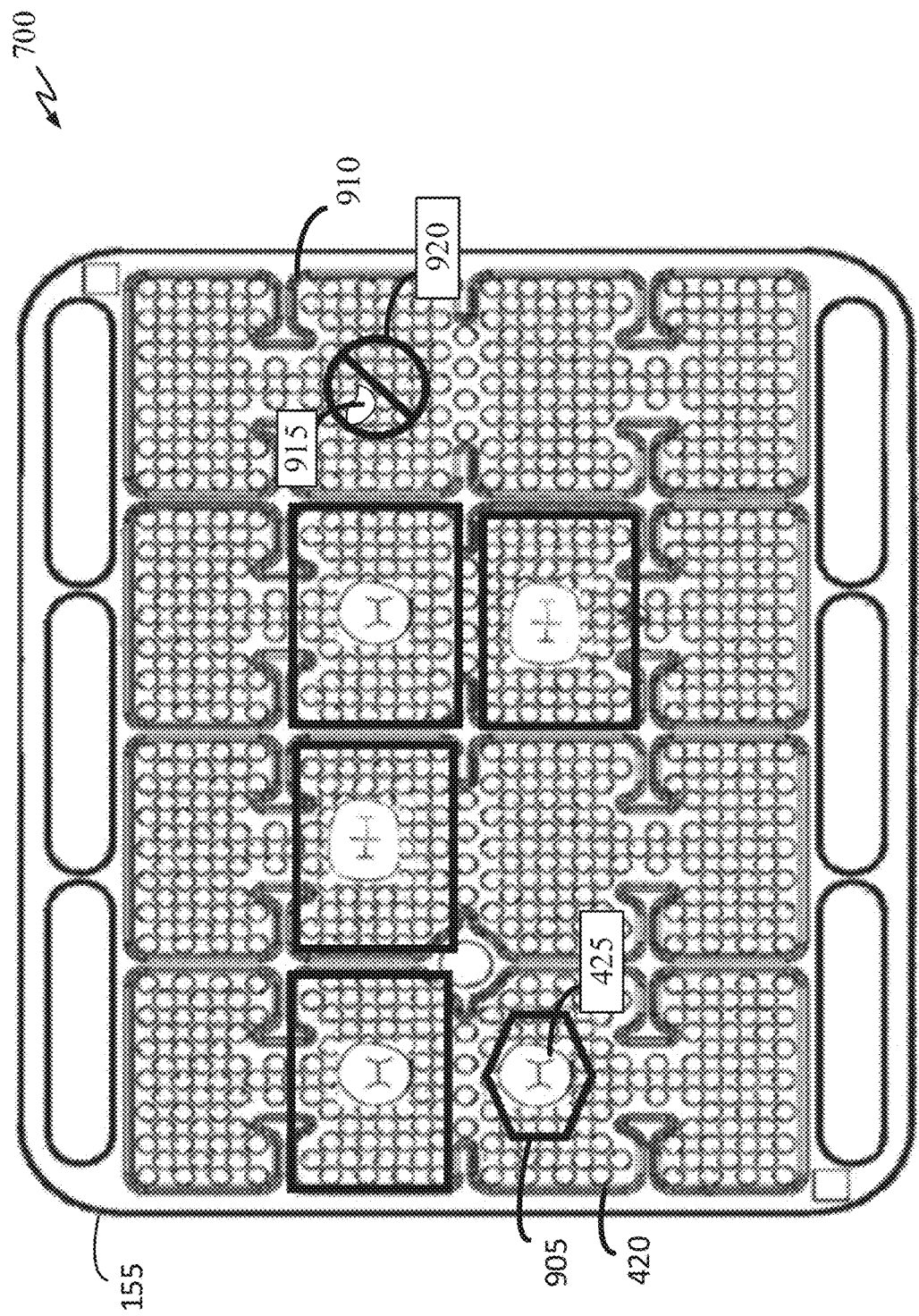
FIG. 9 illustrates various quality control features in accordance with some embodiments of the present disclosure.

FIG. 9 illustrates the user interface 700 having overlays of cargo information over the container 155 in accordance with some embodiments of the disclosure. In some embodiments, the tracking module 600 can use the cargo information to display various visual indicators to assist the operator to perform quality control. For example, using machine learning algorithms and image analysis, the tracking module 600 can determine that a dental prosthesis 425 in the pocket 420 is a bridge. However, based on the received cargo information, the dental prosthesis 425 is a crown. As a result of this discrepancy, the tracking module 600 can highlight the pocket 420 and/or the dental prosthesis 425 using a visual indicator 905. In this way, the operator can quickly determine that an incorrect dental prosthesis is in the pocket 420. This also enables the operator to make immediate corrective actions.

The tracking module 600 can also use visual indicator to highlight pockets of the container 155 that are missing a dental prosthesis and/or are hosting an unregistered dental prosthesis or other object. For example, according to the received cargo information for the container 155, a pocket 910 is empty. However, the camera 160 may detect an object 915 in the pocket 910. This can trigger the tracking module 600 to display a warning visual indicator 920 to warn the operator an unwanted object is in the container 155. In another example, according to the received cargo information for the container 155, the pocket 910 is registered to host a crown. However, the pocket 910 can be empty. In this example, the tracking module 600 can display a missing prosthesis indicator on the user interface 700.

Figure 10:
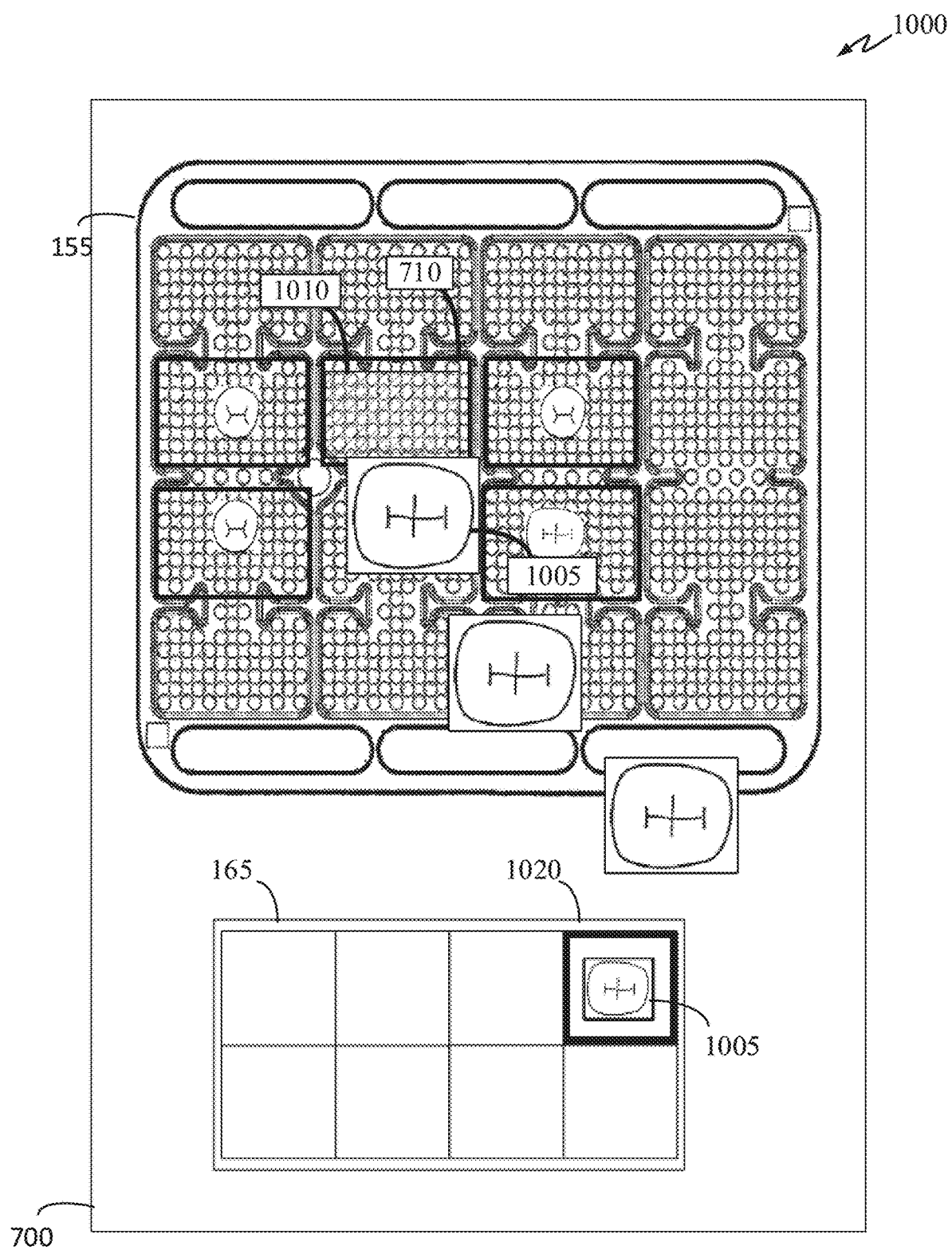
FIGS. 10 and 11 illustrate various features of the transferring and tracking system in accordance with some embodiments of the present disclosure.

FIG. 10 illustrates a tracking process 1000 performed by the tracking module 600 in accordance with some embodiments of the present disclosure. The tracking process 1000 can begin once the tracking module 600 receives the cargo information from the management system 102. In some embodiments, a steady-state image is first obtained. A steady-state image is state where all of the dental prostheses are accounted for and are in their registered pockets of the container 155. Alternatively, a steady state is where all pockets registered to host a dental prosthesis are detected to contain a dental prosthesis. Additionally, the steady state can also include an initial image of the tray 165 being empty. In other words, each destination slot of the tray 165 is empty. In some embodiments, the tray 165 can have 8 destination slots, each of which has a unique identifier.

Once a dental prosthesis from one of the registered pockets of the container 155 is moved, the steady state is disturbed and the tracking process can begin. As shown in FIG. 10, a dental prosthesis 1005 is picked up and moved. This triggers a response and a visual indicator can be overlaid on the affected pocket. In this example, a pocket 710 can be visually distinguished from adjacent pockets (unaffected pocket) using an overlay 1010. In some embodiments, the display of the overlay 1010 is optional.

Once motion is detected, the tracking module 600 can detect and identify the affected pocket. Identifying the affected pocket can include determining the pocket ID of the affected pocket, which can be used to determine other portions of the cargo information relating to the affected pocket. For example, the pocket 710 corresponds with pocket ID #6 and a crown prosthesis with an ID of 12 (see FIG. 8). The cargo information for the affected pocket can be retrieved by the tracking module 600. Once the dental prosthesis is transferred from the container 155 to the tray 165, the cargo information can be updated to include the IDs of the tray 165 and the destination slot within the tray 165. The updated cargo information is then transmitted back to the management system 102.

A transfer can be considered to have been completed once a dental prosthesis is dropped into one of the destination slots of the tray 165. The tracking module 600 can determine which slot the dental prosthesis was placed into by comparing a current image with an initial or steady-state image (when the tray 165 is empty). Alternatively, the tracking module 600 can determine which slot the dental prosthesis was placed into by detecting the present of an object in one of the destination slots. Here, a crown 1005 is detected to be in a destination slot 1020. At this point, the tracking module 600 can record that the dental prosthesis that was in the pocket 710 of the container 155 is transferred to the destination slot 1020 of the tray 165. Additionally, since cargo information is available (from the management system 102) for the pocket 710, the tracking module can know exactly which type of dental prosthesis was transferred to the destination slot 1020.

In some embodiments, the tracking module 600 can update the cargo information for the dental prosthesis 1005 by adding the IDs of the tray 165 and the destination slot 1020. The tracking module 600 can then transmit the updated cargo information relating to the dental prosthesis 1005 to the management system 102. In this way, when the tray 165 goes through additional processing such as the sintering process, the tracking module 600 can keep track of each dental prosthesis and the chain of custody is properly maintained. In some embodiments, the tracking module 600 can track the dental prosthesis 1005 continuously from the moment it was moved from the pocket 710 until the moment it is dropped into the slot 1020.

Figure 11:
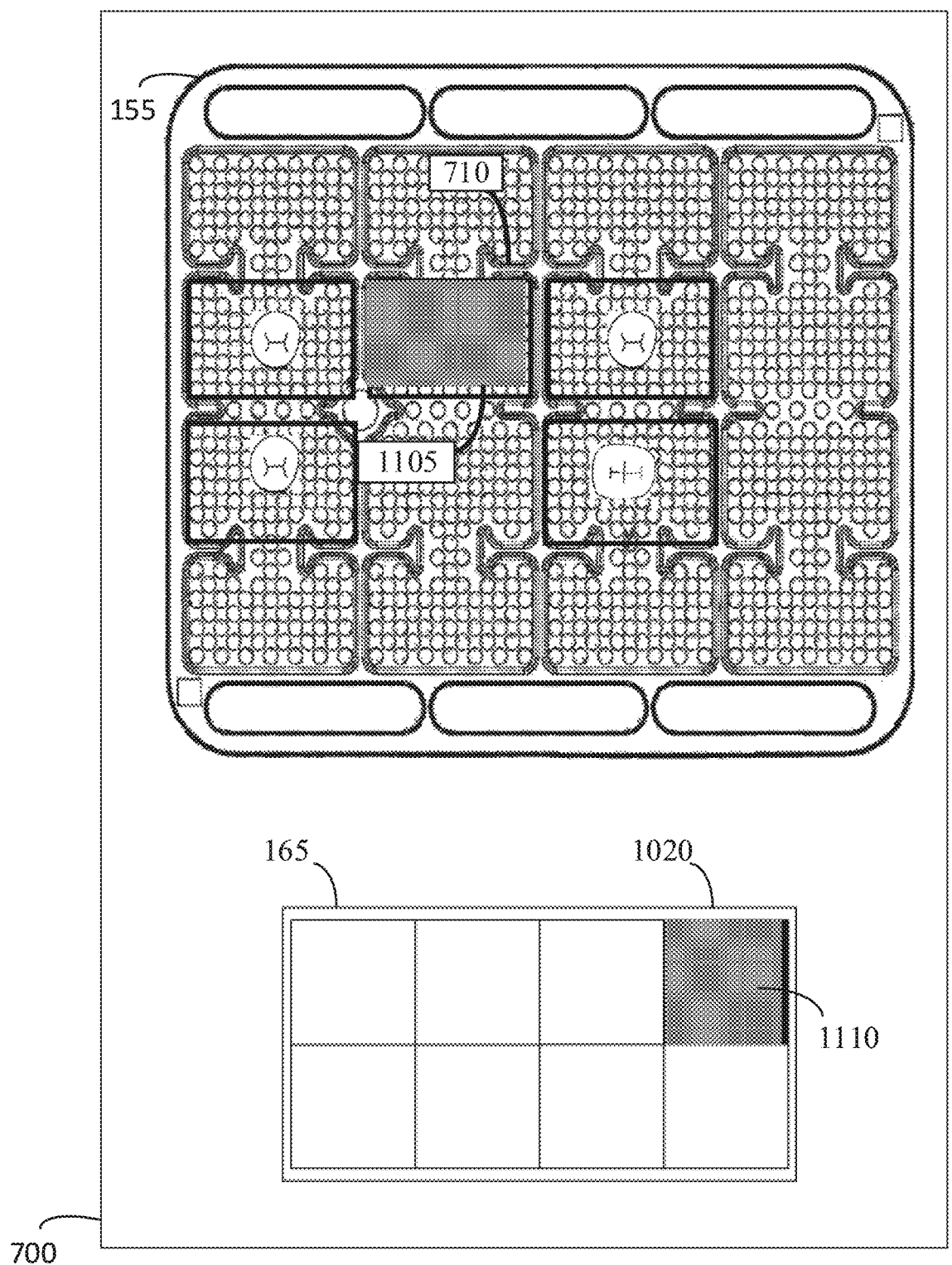

FIG. 11 illustrates a portion of the tracking process 1000 in accordance with some embodiments of the present disclosure. After the dental prosthesis 1005 (see FIG. 10) is transferred from the container 155 to the tray 165, the tracking module 600 can reset the steady-state and obtain a new steady state so the pocket 710 and the slot 1020 are no longer tracked. One of the benefits for performing this step is to reduce the chance for errors caused by the motion of the operator's hand or grappling instrument, which could be misinterpreted to be movements of a prosthesis.

As shown in FIG. 11, the tracking of the pocket 710 can be made inactive and/or blocked as a candidate of a source pocket, which is a pocket in which a dental prosthesis to be moved is hosted. In some embodiments, an overlay 1105 can be displayed over the pocket 710 to indicate that the pocket 710 has been deactivated. Similarly, the destination slot 1020 of the tray 165 can also be deactivated as a potential destination slot for receiving a dental prosthesis. In some embodiments the tracking module 600 can deactivate the destination slot 1020 and can also overlay a visual indicator 1110 to indicate that the destination slot 1020 is currently registered to host a dental prosthesis (i.e., the dental prosthesis 1005). Once the destination slot 1020 is deactivated, it is eliminated as a potential host for a new dental prosthesis from the container 155. Again, one of the advantages for deactivating a destination slot is to reduce potential errors caused by the motion of the operator's hand or grappling instrument, which could be misinterpreted to be placement of a prosthesis into a slot.

Figure 12:
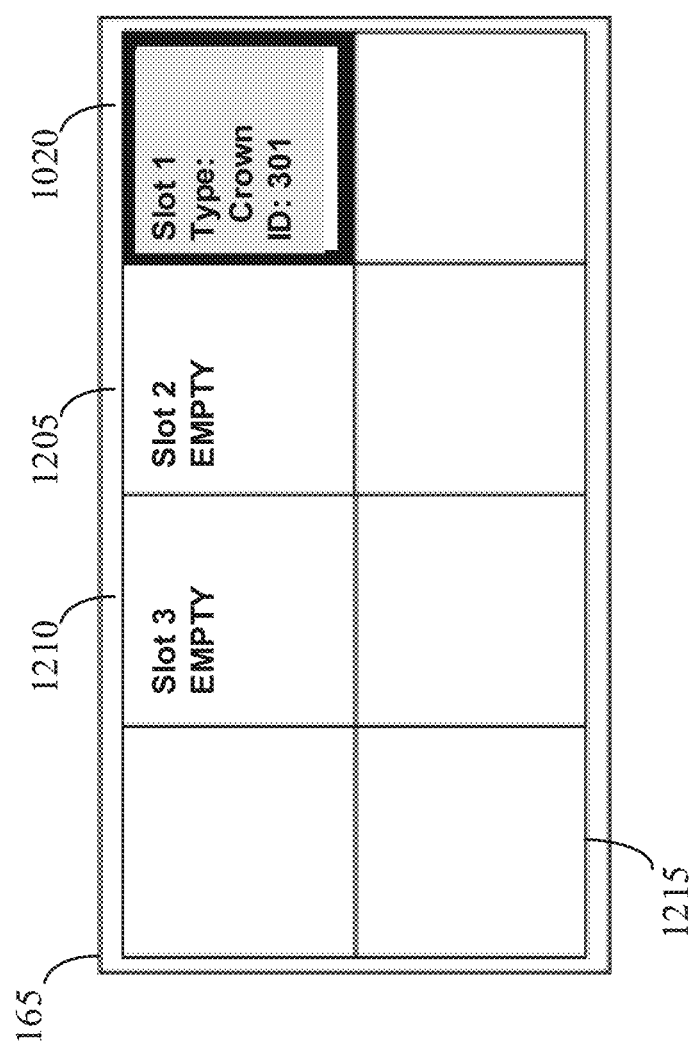
FIG. 12 illustrates various quality control features in accordance with some embodiments of the present disclosure.

FIG. 12 illustrates the user interface 700 having overlays of cargo information over the tray 165 in accordance with some embodiments of the disclosure. In some embodiments, each destination slot of the tray 165 can be visually enhanced with overlaying information about each slot. For example, the destination slot 1020 can be visually enhanced with overlaying information that includes the slot ID, the dental prosthesis type of the prostheses currently being hosted, and the ID of the dental prosthesis currently being hosted. Additionally, the slots 1205 and 1210 can each show a slot ID and an empty status. Alternatively, each empty slot can be left blank as in the slot 1215.

Figure 13:
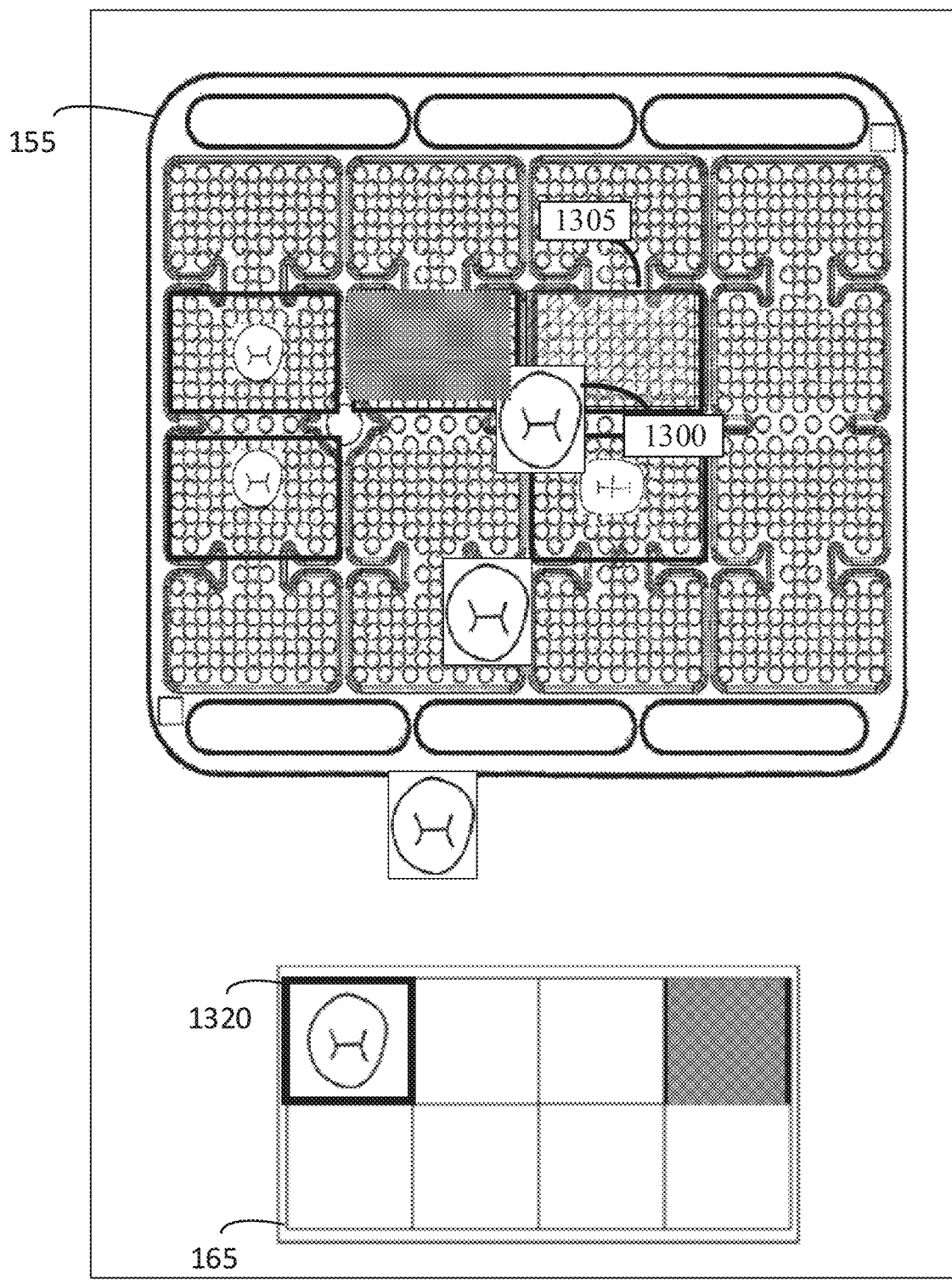
FIG. 13 illustrates various features of the transferring and tracking system in accordance with some embodiments of the present disclosure.

FIG. 13 illustrates a progression of the tracking process 1000 in accordance with some embodiments of the present disclosure. Once a second dental prosthesis from one of the registered pockets of the container 155 is moved, the new steady state as described in FIG. 11 is disturbed and the tracking process of the second prosthesis can begin. The dental prosthesis 1300 can be moved from the container 155 to the tray 165 manually by an operator or automatically using a robotic grappler. Once motion is detected in a pocket 1305, for example, or the absence of the dental prosthesis 1300 from the pocket 1305 is detected, the tracking of the dental prosthesis 1300 can begin. This can also trigger a visual indicator to be overlaid on the pocket 1305. In this example, a semi-transparent box can be overlaid over the pocket 1305 to indicate that it is a currently active pocket, a pocket in which a dental prosthesis is being transferred. In some embodiments, the semi-transparent box can be color-coded and can provide additional visual highlighting, such as blinking, flashing, or the like.

Next, the tracking module 600 can detect and identify the pocket 1305 and determine the pocket ID of the pocket 1305. The pocket ID can then be used to determine other portions of the cargo information relating to the pocket 1305. For example, the pocket 1305 corresponds with pocket ID #10 and a crown prosthesis with an ID of 333 (see FIG. 8). The cargo information for the affected pocket can be retrieved from the management system 102 by the tracking module 600. Once the dental prosthesis is transferred from the container 155 to the tray 165, the cargo information for the dental prosthesis 1300 can be updated to include the IDs of the tray 165 and the destination slot within the tray 165. Next, the updated cargo information is then transmitted back to the management system 102.

The tracking module 600 can determine which slot the dental prosthesis 1300 was placed into the tray 165 by comparing a current image with the new steady-state image as described in FIG. 11. Alternatively, the tracking module 600 can determine which slot the dental prosthesis was placed into by detecting the present of an object in one of the destination slots. Here, the crown 1300 is detected to be in a destination slot 1320. At this point, the tracking module 600 can record that the dental prosthesis that was in the pocket 1305 of the container 155 was transferred to the destination slot 1320 of the tray 165.

Additionally, since cargo information is available (from the management system 102) for the pocket 1305, the tracking module 600 can update the cargo information for the dental prosthesis 1300 to include the IDs of the tray 165 and the slot 1320. The tracking module 600 can then transmit the updated cargo information relating to the dental prosthesis 1300 to the management system 102. In this way, the chain of custody of each dental prosthesis is maintained.

Figure 14:
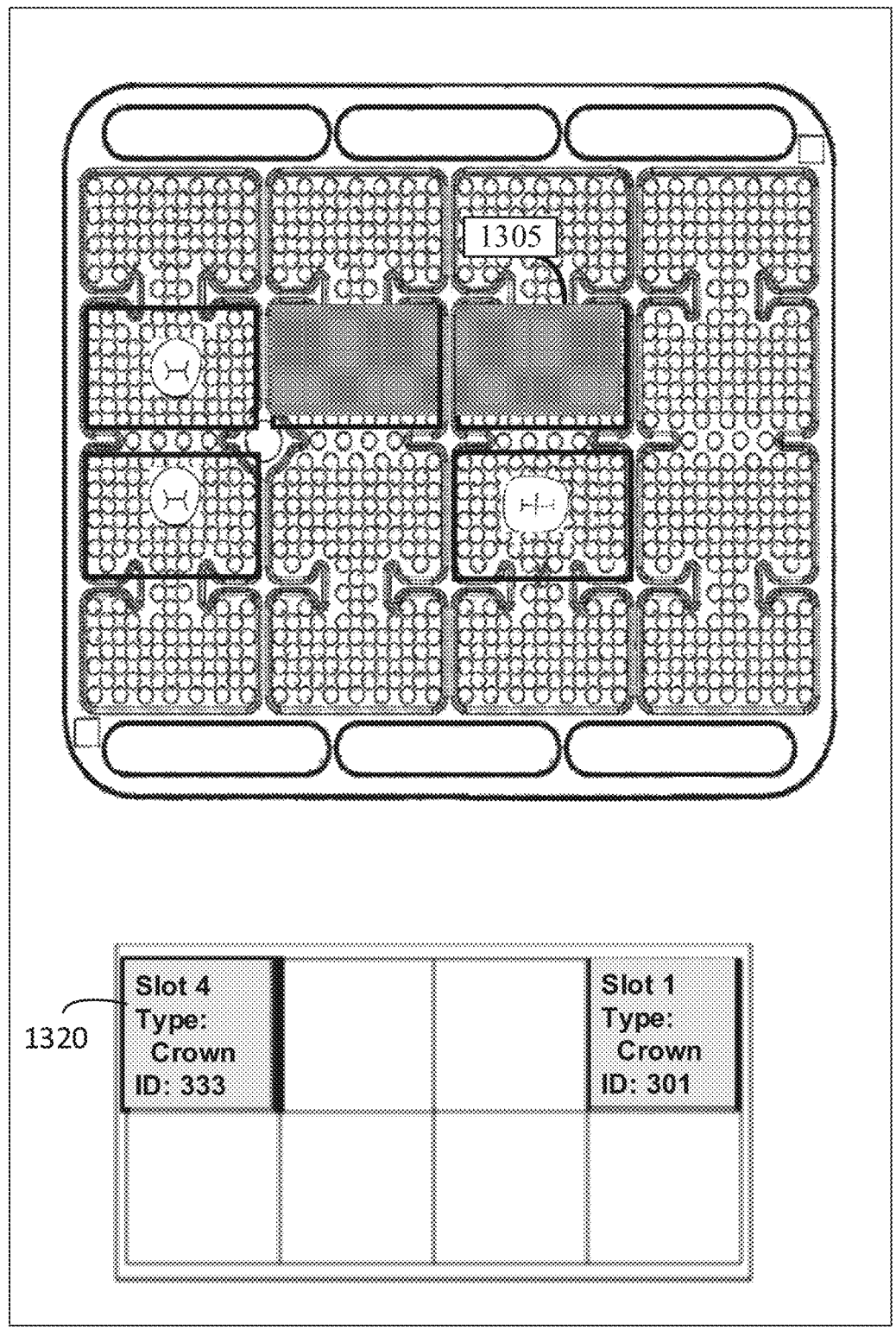
FIG. 14 illustrates various quality control features in accordance with some embodiments of the present disclosure.

FIG. 14 illustrates a steady-state reset process of the tracking process 1000 in accordance with some embodiments of the present disclosure. After the dental prosthesis 1300 (see FIG. 13) is transferred from the container 155 to the tray 165, the tracking module 600 can again reset the steady-state and obtain a new steady state so that the pocket 1305 and the slot 1320 are no longer tracked. In some embodiments, an opaque overlay can be shown over the pocket 1305 and the slot 1320 to visually indicate that the pocket 1305 and the slot 1320 are deactivated as a source pocket and a destination slot, respectively. In other words, the pocket 1305 can be deactivated and/or blocked as being a candidate of a source pocket. Similarly, the destination slot 1320 of the tray 165 can also be deactivated as a potential destination slot for receiving a dental prosthesis. Once the destination slot 1320 is deactivated, it is eliminated as a potential host for a new dental prosthesis during the next transfer cycle. The transfer process then repeats and cycle through the process stages described in FIGS. 11, 12, 13, and 14 until all dental prostheses in the container 155 have been transferred to the tray 165.

Figure 15:
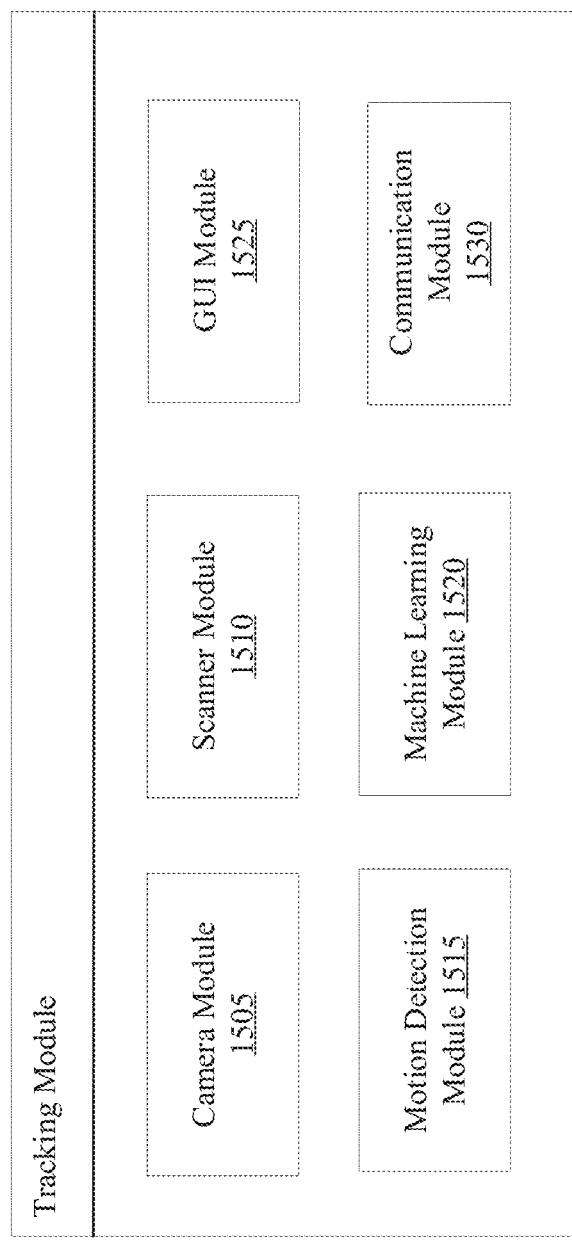
FIG. 15 illustrates a tracking module of the tracking system in accordance with some embodiments of the present disclosure.

FIG. 15 illustrates a system diagram of the tracking module/system 600 in accordance with some embodiments of the disclosure. The tracking system 600 may include a camera module 1505, a scanner module 1510, a motion detection module 1515, a machine learning module 1520, a graphical user interface (GUI) module 1525, and a communication module 1530. The tracking system 600 may reside on a single server or may be distributedly located. For example, one or more system components (e.g., 1505, 1510, 1515, etc.) of the system 600 may be distributedly located at various locations throughout a network. For example, the machine learning module 1520 may reside either on a local computer or on the cloud on a remote server. Each component or module of the system 600 may communicate with each other and with external entities via the communication module 1530. Each component or module of the system 600 may include its own sub-communication module to further facilitate with intra and/or inter-system communication.

The camera module 1505 contains codes, instructions, and algorithms which when executed by a processor will cause the processor to control one or more cameras 160 of the system 600 and to cause each the camera 160 to take pictures and/or video.

The scanner module 1510 contains codes, instructions, and algorithms which when executed by a processor will cause the processor to control one or more scanners 605 of the system 600 and to cause each of the scanners 605 to scan identifying marks on the container 155 and the tray 165.

The motion detection module 1515 contains codes, instructions, and algorithms which when executed by a processor will cause the processor to detect motion in the field of view of the camera 160 using images and/or videos from the camera 160.

The machine learning module 1520 contains codes, instructions, and algorithms which when executed by a processor will cause the processor to use machine learning algorithms to detect and identify a dental prosthesis using a dental prosthesis training data set.

The GUI module 1525 contains codes, instructions, and algorithms which when executed by a processor will cause the processor to generate the user interface 700 and various features of the user interface 700 as described in FIGS. 7, 8, 9, 10, 11, 12, 13, and 14. The user interface module 1525 may also include codes, instructions, and algorithms to perform one or more processes described in FIGS. 7, 8, 9, 10, 11, 12, 13, and 14, such as the tracking process 1000.

Figure 16:
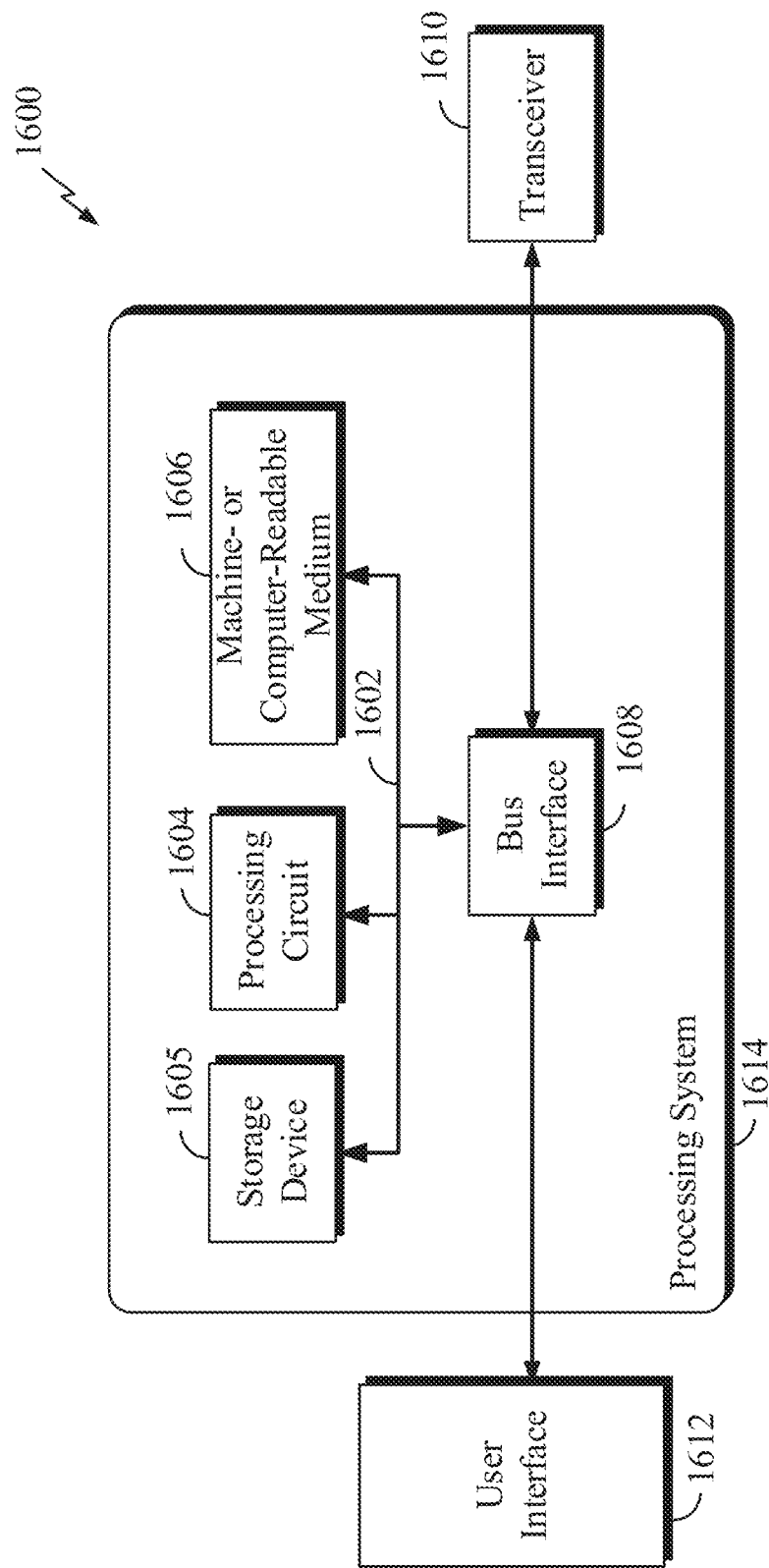
FIG. 16 is a block diagram illustrating an example of a hardware implementation for an apparatus employing a processing system that may exploit the systems and methods of FIGS. 6-14 in accordance with some embodiments of the disclosure.

FIG. 16 illustrates an overall system or apparatus 1600 in which the module 600 and the process 100 can be implemented and the user interface 700 can be generated. In accordance with various aspects of the disclosure, an element, or any portion of an element, or any combination of elements may be implemented with a processing system 1614 that includes one or more processing circuits 1604. The processing circuits 1604 may include micro-processing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionality described throughout this disclosure. That is, the processing circuit 1604 may be used to implement any one or more of the processes described above and illustrated in FIGS. 6 through 14.

In the example of FIG. 16, the processing system 1614 may be implemented with a bus architecture, represented generally by the bus 1602. The bus 1602 may include any number of interconnecting buses and bridges depending on the specific application of the processing system 1614 and the overall design constraints. The bus 1602 links various circuits including one or more processing circuits (represented generally by the processing circuit 1604), the storage device 1605, and a machine-readable, processor-readable, processing circuit-readable or computer-readable media (represented generally by a non-transitory machine-readable medium 1608.) The bus 1602 may also link various other circuits such as timing sources, peripherals, voltage regulators, and power management circuits, which are well known in the art, and therefore, will not be described any further. The bus interface 1608 provides an interface between bus 1602 and a transceiver 1616. The transceiver 1616 provides a means for communicating with various other apparatus over a transmission medium. Depending upon the nature of the apparatus, a user interface 1612 (e.g., keypad, display, speaker, microphone, touchscreen, motion sensor) may also be provided.

The processing circuit 1604 is responsible for managing the bus 1602 and for general processing, including the execution of software stored on the machine-readable medium 1608. The software, when executed by processing circuit 1604, causes processing system 1614 to perform the various functions described herein for any particular apparatus. Machine-readable medium 1608 may also be used for storing data that is manipulated by processing circuit 1604 when executing software.

One or more processing circuits 1604 in the processing system may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

The software may reside on machine-readable medium 1608. The machine-readable medium 1608 may be a non-transitory machine-readable medium. A non-transitory processing circuit-readable, machine-readable or computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a machine or computer. The terms "machine-readable medium", "computer-readable medium", "processing circuit-readable medium" and/or "processor-readable medium" may include, but are not limited to, non-transitory media such as portable or fixed storage devices, optical storage devices, and various other media capable of storing, containing or carrying instruction(s) and/or data. Thus, the various methods described herein may be fully or partially implemented by instructions and/or data that may be stored in a "machine-readable medium," "computer-readable medium," "processing circuit-readable medium" and/or "processor-readable medium" and executed by one or more processing circuits, machines and/or devices. The machine-readable medium may also include, by way of example, a carrier wave, a transmission line, and any other suitable medium for transmitting software and/or instructions that may be accessed and read by a computer.

The machine-readable medium 1608 may reside in the processing system 1614, external to the processing system 1614, or distributed across multiple entities including the processing system 1614. The machine-readable medium 1608 may be embodied in a computer program product. By way of example, a computer program product may include a machine-readable medium in packaging materials. Those skilled in the art will recognize how best to implement the described functionality presented throughout this disclosure depending on the particular application and the overall design constraints imposed on the overall system.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the following detailed description are presented in terms of algorithms and symbolic representations of operations on data bits within a computer memory. These algorithmic descriptions and representations are the methods used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared or otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following disclosure, it is appreciated that throughout the disclosure terms such as "processing," "computing," "calculating," "determining," "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. It will be appreciated that a variety of programming languages may be used to implement the teachings of the invention as described herein.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats.

Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A system for transferring and tracking dental prostheses, the system comprising:
    a first tray having a plurality of pockets for holding dental prostheses;
    a second tray having a plurality of candidate slots for receiving dental prostheses;
    a camera for capturing images of the first and second trays; and
    a tracking module configured to:
        detect, based on a disturbance in a steady-state image, a first article being transferred from a source pocket of the first tray to a destination slot of the second tray using the captured images;
        determine, using the captured images, a drop location of the first article in the second tray, wherein the drop location is the destination slot where the first article is dropped in the second tray;
        transmit the drop location to a remote server; and
        deactivate the source pocket and the destination slot after the first article is transferred from the source pocket of the first tray to the destination slot of the second tray,
    wherein the tracking module comprises a camera module to control the camera,
    and
    wherein the tracking module is configured to detect the first article being transferred from the source pocket of the first tray to the destination slot of the second tray by monitoring any movement of the first article in the source pocket of the first tray and continuously following the first article from the moment the first article is picked up from the source pocket of the first tray to the moment when the first article is placed into the destination slot of the second tray.

2. The system of claim 1, wherein the tracking module is further configured to:
    scan the first tray for a first tray ID;
    determine a pocket ID of a pocket from which the first article came;
    transmit the first tray ID to the remote server;
    receive identification data for one or more dental prostheses in response to transmitting the first tray ID, wherein the identification data comprises a pocket ID of the pocket to which each article is registered and an article ID of each article in the first tray; and
    verify, using the captured images, each article is in its assigned pocket based on the received pocket ID.

3. The system of claim 2, wherein the tracking module is configured to detect the first article being transferred from the first tray to the second tray by determining an absence of the first article from a first pocket of the plurality of pockets of the first tray, wherein the first pocket was previously verified to contain the first article.

4. The system of claim 2, wherein the tracking module is further configured to overlay one or more elements of the received identification data of the first article over a destination slot of the second tray containing, wherein the destination slot is where the first article is transferred.

5. The system of claim 2, wherein the tracking module is further configured to overlay one or more elements of the received identification data of each article over a corresponding pocket of the first tray containing an article identified by the received identification data, in response to receiving the identification data of each article in the first tray.

6. The system of claim 2, wherein the tracking module is further configured to:
    scan the second tray for a second tray ID, the second tray having a plurality of destination slots for receiving the dental prostheses, each destination slot having a slot ID, wherein the drop location is determined by identifying the slot ID of the destination slot where the first article is dropped; and
    transmit the second tray ID and the slot ID of the destination slot containing the first article.

7. The system of claim 6, wherein the tracking module is further configured to remove the destination slot as a future drop slot.

8. The system of claim 2, wherein the tracking module is further configured to highlight each pocket of the first tray containing an article in response to receiving the identification data of each article in the first tray.

9. A method for transferring and tracking articles of manufacture, the method comprising:
   detecting a first article being transferred from a source pocket of a first container to a destination slot of a second container using one or more images captured by a camera, wherein the detecting is based on a disturbance in a steady-state image;
   determining where the first article is transferred to the second container by tracking where the first article is dropped in the second container using the one or more images;
   transmitting a location data of the first article in the second container to remote server; and
   deactivating the source pocket and the destination slot after the first article is transferred from the source pocket of the first container to the destination slot of the second container,
   wherein detecting the first article being transferred from the source pocket of the first container to the destination slot of the second container comprises monitoring movement of the first article in the source pocket of the first container and continuously following the first article from the moment the first article is picked up from the first container to the moment when the first article is placed into the destination slot of the second container.

10. The method of claim 9, further comprising:
    scanning, using a scanner, the first container for a first container ID, the first container having a plurality of pockets, wherein each of the plurality of pockets has a pocket ID;
    transmitting the first container ID to the remote server;
    receiving identification data for one or more articles of manufacture in response to transmitting the first container ID, wherein the identification data comprises a pocket ID and an article ID; and
    verifying, using the camera, each article is in a proper pocket based on the received pocket ID associated with each article using the one or more images from the camera.

11. The method of claim 10, wherein transmitting the location data of the first article further comprises transmitting the pocket ID of the pocket containing the first article along with the location data.

12. The method of claim 11, further comprising:
    scanning the second container for a second container ID, the second container having a plurality of destination slots for receiving the articles of manufacture, each destination slot having a slot ID, wherein tracking where the first article is dropped in the second container comprises identifying a destination slot from the plurality of candidate slots where the first article is dropped; and
    transmitting the second container ID and the slot ID of the slot where the first article is located along with the pocket ID associated with the first article to the remote server.

13. The method of claim 12, further comprising removing the destination slot as a candidate slot for receiving a new article of manufacturer, wherein a candidate slot is an empty slot ready to receive an article of manufacture.

14. The method of claim 9, wherein detecting the first article being transferred from the first container to the second container comprises determining an absence of the first article from a first pocket of the plurality of pockets, wherein the first pocket is registered to contain the first article.

15. The method of claim 9, further comprising overlaying one or more elements of received identification data of the first article over a first destination slot of the second container.

16. The method of claim 10, wherein scanning the first container comprises scanning an identification mark on the first container.

17. The method of claim 16, wherein the identification mark comprises a bar code or alphanumeric characters.

18. The method of claim 10, further comprising highlighting one or more pockets of the first container containing an article in response to receiving the identification data of each article in the first container.

19. The method of claim 10, further comprising highlighting a pocket of the first container containing an object not identified by the received identification data on the one or more articles of manufacture, in response to receiving the identification data of each article in the first container.

20. The method of claim 10, further comprising overlaying one or more elements of the received identification data of each article over a corresponding pocket of the first container containing an article identified by the received identification data, in response to receiving the identification data of each article in the first container.

* * * * *